US008696469B2

(12) United States Patent
Youm et al.

(10) Patent No.: US 8,696,469 B2
(45) Date of Patent: *Apr. 15, 2014

(54) INTERACTIVE ASYNCHROUNOUS COMPUTER GAME INFRASTRUCTURE

(71) Applicant: Tetris Online, Inc., Honolulu, HI (US)

(72) Inventors: Eui-Joon Youm, Honolulu, HI (US); Glyn C. Thomas, Honolulu, HI (US); Chang-ha Lim, Honolulu, HI (US)

(73) Assignee: Tetris Online, Inc., Honoulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/744,444

(22) Filed: Jan. 18, 2013

(65) Prior Publication Data

US 2013/0130807 A1 May 23, 2013

Related U.S. Application Data

(63) Continuation of application No. 12/638,249, filed on Dec. 15, 2009, now Pat. No. 8,357,045.

(60) Provisional application No. 61/201,785, filed on Dec. 15, 2008, provisional application No. 61/254,385, filed on Oct. 23, 2009.

(51) Int. Cl.
*A63F 13/00* (2006.01)

(52) U.S. Cl.
USPC .............................. 463/42; 463/4

(58) Field of Classification Search
USPC ........................................ 463/4, 42
See application file for complete search history.

(56) References Cited

U.S. PATENT DOCUMENTS

| 5,782,692 | A |   | 7/1998  | Stelovsky |
|-----------|---|---|---------|-----------|
| 5,830,067 | A |   | 11/1998 | Graves et al. |
| 5,846,132 | A |   | 12/1998 | Junkin |
| 6,024,643 | A | * | 2/2000  | Begis .............................. 463/42 |
| 6,080,063 | A |   | 6/2000  | Khosla |

(Continued)

FOREIGN PATENT DOCUMENTS

| GB | 2444767           | 6/2008  |
| WO | WO 02/011083      | 7/2002  |
| WO | WO 2010/075070 A1 | 7/2010  |
| WO | WO 2011/149564 A1 | 12/2011 |

OTHER PUBLICATIONS

NPL_2, "Hell is Other People", http://www.indiegames.com/blog/2009/10/browser_game_pick_hell_is_othe.html, Oct. 17, 2009.

(Continued)

*Primary Examiner* — Dmitry Suhol
*Assistant Examiner* — Jason Yen
(74) *Attorney, Agent, or Firm* — Goodsill Anderson Quinn & Stifel, LLP

(57) ABSTRACT

In embodiments of the present invention improved capabilities are described for a computer program product embodied in a computer readable medium that, when executing on one or more computers, receives a request for game play, and in response to the request, causing prior game play data to be retrieved, where the prior game play data was stored in response to prior game play of another user. Further, an asynchronous game play environment may be provided where an active participant, who made the request, is able to play against and interact with an apparently live participant based on the prior game play data.

19 Claims, 23 Drawing Sheets

(56) References Cited

U.S. PATENT DOCUMENTS

| | | | |
|---|---|---|---|
| 6,273,820 | B1 | 8/2001 | Haste, III et al. |
| 6,322,451 | B1 | 11/2001 | Miura |
| 6,876,496 | B2 | 4/2005 | French et al. |
| 6,887,159 | B2 | 5/2005 | Leen et al. |
| 6,951,516 | B1 | 10/2005 | Eguchi et al. |
| 7,288,028 | B2 | 10/2007 | Rodriquez et al. |
| 7,470,197 | B2 | 12/2008 | Massey et al. |
| 7,828,661 | B1 | 11/2010 | Fish et al. |
| 7,937,314 | B2 | 5/2011 | Jung et al. |
| 8,038,535 | B2 | 10/2011 | Jensen |
| 8,313,370 | B2 | 11/2012 | Rogers et al. |
| 2002/0082088 | A1 | 6/2002 | Nagashima |
| 2002/0126846 | A1 | 9/2002 | Multerer et al. |
| 2003/0032481 | A1 | 2/2003 | Pfeiffer |
| 2004/0092312 | A1 | 5/2004 | Toyoda |
| 2004/0152519 | A1* | 8/2004 | Wang et al. ............ 463/42 |
| 2004/0248652 | A1 | 12/2004 | Massey et al. |
| 2005/0277472 | A1 | 12/2005 | Gillan et al. |
| 2006/0178216 | A1 | 8/2006 | Shea et al. |
| 2006/0246973 | A1* | 11/2006 | Thomas et al. ............ 463/4 |
| 2006/0287106 | A1 | 12/2006 | Jensen |
| 2007/0054717 | A1 | 3/2007 | Youm et al. |
| 2007/0060359 | A1* | 3/2007 | Smith ............ 463/42 |
| 2007/0123353 | A1 | 5/2007 | Smith |
| 2007/0234005 | A1 | 10/2007 | Erlingsson et al. |
| 2007/0270225 | A1* | 11/2007 | Wang et al. ............ 463/42 |
| 2008/0039167 | A1 | 2/2008 | Harris et al. |
| 2008/0081692 | A1 | 4/2008 | Pope et al. |
| 2008/0153595 | A1 | 6/2008 | Chickering et al. |
| 2008/0220873 | A1 | 9/2008 | Lee et al. |
| 2009/0075737 | A1 | 3/2009 | Harris |
| 2009/0149248 | A1 | 6/2009 | Busey et al. |
| 2009/0181767 | A1 | 7/2009 | Feng |
| 2009/0215531 | A1 | 8/2009 | Perlman et al. |
| 2009/0325712 | A1 | 12/2009 | Rance |
| 2010/0113115 | A1 | 5/2010 | Hightower |
| 2010/0160038 | A1 | 6/2010 | Youm et al. |
| 2010/0227679 | A1 | 9/2010 | Konishi et al. |
| 2011/0213655 | A1 | 9/2011 | Henkin et al. |
| 2011/0276744 | A1 | 11/2011 | Sengupta et al. |
| 2012/0009997 | A1 | 1/2012 | Youm |
| 2012/0010734 | A1 | 1/2012 | Youm |

OTHER PUBLICATIONS

NPL_3, "Hell is Other People", http://notheinternet.com/hell/, (webpage referenced by NPL_2 in) 2009.

NPL_4, "Mario Kart 64", Wikipedia, the free encyclopedia, http://en.wikipedia.org/wiki/Mario_Kart_64, May 16, 2010.

NPL_5, "YouTube: Mario Kart", http://www.youtube.com/watch?v=rdg4P6O40hE, uploaded May 2, 2010.

NPL_6, "Ghost Racer Save, Race Against Saved Ghost", http://www.gamespot.com/snes/action/supermariokart/hints.html, 2010.

NPL_10, International Application Serial No. PCT/US2009/68024, Search Report and Written Opinion mailed Mar. 30, 2010.

International Application Serial No. PCT/US2011/022225, Search Report and Written Opinion mailed Apr. 28, 2011.

NPL_14, "Mario Kart 64 Ghost Game", Mario Kart 64 AU Manual—Part 1, 1-17, 1997.

NPL_14, "Mario Kart 64 Ghost Game", Mario Kart 64 AU Manual—Part 2, 18-37, 1997.

NPL_13, "Mario Kart Ghost YouTube Screenshots", http://www.youtube.com/watch?v-rdg4P6O40hE, May 2, 2010, 9.

U.S. Appl. No. 13/012,224, Non-Final Office Action mailed Feb. 10, 2010.

U.S. Appl. No. 13/012,743, Non-Final Office Action mailed Feb. 10, 2010.

U.S. Appl. No. 13/012,773, Non-Final Office Action mailed Feb. 10, 2010.

U.S. Appl. No. 13/012,557, Non-Final Office Action mailed Apr. 27, 2012.

Texas Memory Systems, RamSan-400 Helps EVE Online Set Record for Most Concurrent Users, Nov. 12, 2005, http://www.ramsan.com/resources/successStories/71.

Colin White, Database Technology for the Web: Part 1—The MapReduce Debate, Jun. 24, 2009, http://www.b-eye-network.com/view/10786.

U.S. Appl. No. 13/012,761, Non-Final Office Action mailed May 7, 2012.

R. Ramakrishnan and J. Gehrke, Database Management Systems 3ed, Jan. 26, 2003, http://www.d.umm.edu/~rmaclin/cs4611/notes/Ch11_Hash_Index.pdf.

Justin Smith, Lives Notes from "Asynchronous Games on Social Networks" at Social Gaming Summit, Jun. 13, 2008, http://www.insidesocialgames.com/2008/06/13/lives-notes-from-asynchronous-games-on-social-networks-at-social-gaming-summit/.

U.S. Appl. No. 13/330,145 Final Office Action mailed Jul. 23, 2012.

U.S. Appl. No. 13/012,557 Final Office Action mailed Aug. 8, 2012.

U.S. Appl. No. 13/012,761 Final Office Action mailed Sep. 24, 2012.

U.S. Appl. No. 13/012,224 Final Office Action mailed Aug. 8, 2012.

U.S. Appl. No. 13/012,773 Final Office Action mailed Aug. 9, 2012.

U.S. Appl. No. 13/012,743 Final Office Action mailed Aug. 8, 2012.

"Tetris Battle from Gmode in Japan", http://tetris.wiki.com/wiki/Tetris_Battle 2002.

NPL-7 "Mario Kart publication dates", US Copyright Office website http://cocatalog.loc.gov/cgi-bin/Pwebrecon.cgi?DB-local &PAGE=First type "Mario Kart" for title search.

NPL-8, "Mario Kart Wii —Computer file", http://cocatalog.loc.gov/cgi-bin/Pwebrecon.cgi?SC-Author&SEQ-2010511201717 &PID=Up2Miu5t4oznyjIbe8NivpUzwpqj&SA-Nintendo+of+America+Inc.

NPL-9, "Mario Kart Wii—Motion Picture", http://cocatalog.loc.gov/cgi-bin/Pwebrecon.cgi?SC=Author&SEQ=20100511201906 &PID=Y8M45eqAXfeDup2y1PAnMVSD8WAB &SA=Nintendo+of+America+Inc.>Nintendo Co., Ltd.

"U.S. Appl. No. 12/638,249, Non-Final Office Action mailed Oct. 21, 2011", Oct. 21, 2011, 11.

"U.S. Appl. No. 12/638,249, Final Office Action mailed Feb. 8, 2012", Feb 8, 2012.

"U.S. Appl. No. 13/330,145, Non-Final Office Action mailed Mar. 14, 2012", Mar. 14, 2012.

"U.S. Appl. No. 12/638,249, Non-Final Office Action mailed Jul. 6, 2012", Jul. 6, 2012.

* cited by examiner

INTERACTIVE ASYNCHROUNOUS COMPUTER GAME INFRASTRUCTURE

CROSS-REFERENCE TO RELATED APPLICATIONS

This application is a continuation of pending U.S. application Ser. No. 12/638,249, filed Dec. 15, 2009, which is hereby incorporated by reference in its entirety, and which claims the benefit of the following provisional applications, each of which is hereby incorporated by reference in its entirety: provisional application 61/201,785, filed Dec. 15, 2008; and provisional application 61/254,385, filed Oct. 23, 2009.

BACKGROUND

1. Field

The present invention is related to computer games, and more specifically to an interactive asynchronous computer game infrastructure.

2. Description of the Related Art

Most current multiplayer computer games fall into two general categories, turn-based and synchronous. In turn-based computer games, much like in a non-computer-based 'board game', players alternate between turns, and so interactivity is very limited. Turn-based games are often referred to as a basic form of asynchronous game play, because of their "one player and then another player" nature.

In synchronous computer games, players typically are interactive, playing all at once, and the actions of multiple players are often depicted in a graphical player interface in real-time. Both of these types of computer game play work well when all the players are logged in and playing the game at the same time. However, when players are not able to be logged in at the same time, turn-based games become games played over a longer period of time rather than in real-time, such as over hours, days, or weeks, and synchronous games become very difficult to play. Even when a player is willing to play an on-line game with a randomly paired stranger, there may be times when a player is unable to find an appropriate opponent, such as one at the same skill level, age, location, and the like. So even though a game might be most enjoyable if it had x number of players of a certain level playing online, most games fail to meet this criteria at some point of service, and the quality of the experience drops greatly, causing the life cycle of the game to be shortened.

Players also desire to interact with other people and/or friends in a manner that is, or at least seems to be, "live". Therefore, there exists a need for a computer game playing method that allows players to be paired up in what looks and feels like real-time play, without the need for all the players to actually be playing simultaneously. In this way, there is a need for a more advanced method of asynchronous game play that allows for an enjoyment level comparable to "true" real-time play, without the limitations imposed by the need for all players to be actively playing the game at the same time.

In addition, even in "true" real time multiplayer game play, users may be matched against pre-recorded games in order to reduce the time that a player has to wait to join a game and/or to increase the amount of apparent user activity. In such cases, the game will typically make calls to a database to obtain game play data. As the number of users increases (such as, for successful online games for example, from tens to hundreds of thousands of concurrent users), the time it takes the database to process the calls increases exponentially, which can lead to undesirable lag times and/or capacity limitations.

Moreover, due to these constraints, system designers may fill buckets of different levels of pre-recorded game play using only a relatively small sample size, and may not be able to optimize the number of sample game plays from the widest variety of actual users, much less store game plays for most, or even all, actual users. A need exists for a more scalable, efficient, and flexible infrastructure to address such challenges.

BRIEF DESCRIPTION OF THE FIGURES

The invention and the following detailed description of certain embodiments thereof may be understood by reference to the following figures.

While the invention has been described in connection with certain preferred embodiments, other embodiments would be understood by one of ordinary skill in the art and are encompassed herein.

All documents referenced herein are hereby incorporated by reference.

DETAILED DESCRIPTION

In embodiments, the present invention may enable a computer game player to have an interactive game play experience with a computer game player opponent without the need for the computer game player opponent to be simultaneously on-line with the computer game player. In embodiments, the computer game player opponent may be a known computer game player opponent, an unknown game player opponent, a computer game player opponent as selected or matched up by the present invention, a computer game player opponent as selected by the computer game player, and the like. That is, the present invention may provide the enjoyment and excitement of playing another player in real-time like play without the need for the other player to be actively playing the game at the same time. For instance, in an embodiment where a set of three players know one another, player one may play player two in the morning. Player three may want to play player one in the afternoon, but player one is no longer logged in. In embodiments, player three may now be able to play a game with player one in the afternoon through an asynchronous game facility of the present invention, where the asynchronous game facility may use data collected during the game played in the morning to simulate the game play of player one in a game with player three who is not presently on-line. In this manner, the present invention may be seen as implementing an advanced method of asynchronous game play, allowing multiple players to interactively play one another, as if in synchronous play, but without the need for all players to be logged-in at the same time.

In embodiments, the present invention may utilize a plurality of stored game data as played by a plurality of players, either known or unknown to the active player. In embodiments, a player may even play 'against themselves', celebrities, or any other individual that has previously played the game and where game data has been collected by the asynchronous game facility. In embodiments, a player may not even need to be currently online to play another player through the asynchronous game facility, such as playing offline on a client, where previous games are stored on the client along with a version of the asynchronous game facility, and such.

Figure 1:
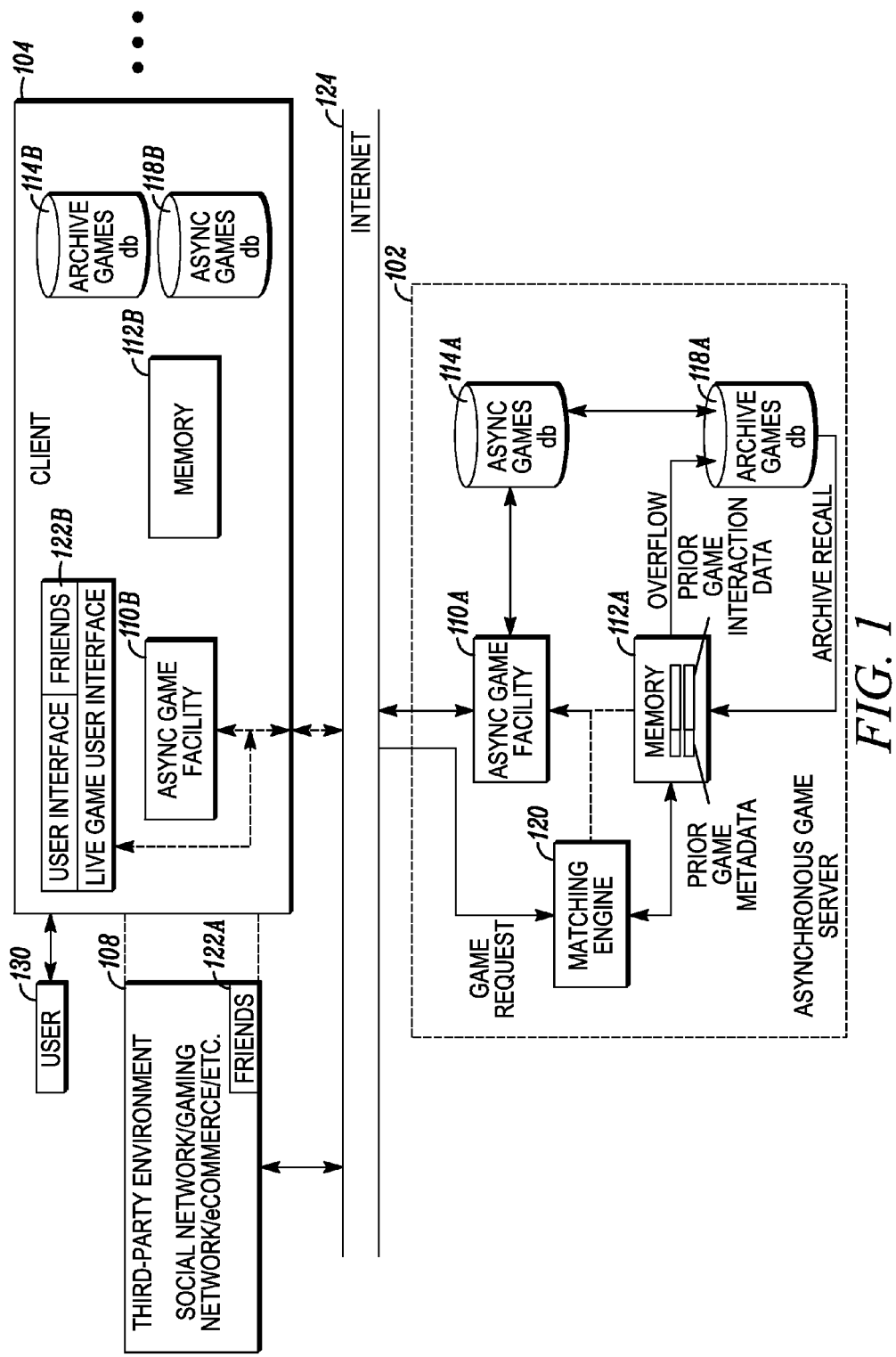
FIG. 1 depicts a top-level block diagram for one embodiment of the present invention.

FIG. 1 shows an embodiment of the present invention, showing an asynchronous game server 102, one of a plurality of clients 104, a third-party environment 108 where on-line games may be found by the client user 130, and the Internet 124 as an interconnection medium. Focusing on the server-side, the present invention may include an asynchronous game server 102 with a server-side asynchronous game facility 110A that implements an asynchronous algorithm for creating a real-time game experience for a user from game data collected from previous game users. This game data may in turn be stored, such as in an asynchronous games database 114A, an archive games database 118A, and the like. In embodiments, game data may be transferred into a memory 112A with faster access time for direct interaction with the client 104 in order to better accommodate the game time requirements of the asynchronous game facility 110A and for improved scalability. That is, the game interface with the user 130 would be run out of memory 112A rather than solely out of the database 118A.

This architecture is different from the way computer games have been presented to users 130 in the past. The asynchronous game server 102 is a new architecture that enables a game to be served, at least effectively, as a "real-time" game, whether to friends or strangers, in asynchronous multiplayer games. The word 'real-time' is put in to emphasize the effectiveness of the server 102 (or the client in embodiments as described herein) because it manages and serves the games from prior game play data in a way that creates an apparent real time environment.

In a preferred embodiment, the server 102 accesses the prior game play data from the memory 112A, as illustrated in FIG. 1, not requiring the service to access the database as often. Serving games in this manner means that it gives the system the ability to match by 'people' instead of based on games. As an illustration to help make this point, consider the diagrams presented in FIG. 2 and FIG. 3. In the alternate embodiment of FIG. 2 games are put into game 'buckets' 132 of different game play skill levels, e.g., levels 1 through 20, where each bucket 132 normally has a fixed size (e.g. 1000 games played at a particular level of play). Normally what is referred to as buckets is a place to collect sets of game records or user profiles to make it easy to match players with games or people. Buckets may, optionally, be tracked through metadata associated with the prior game play data. For example, in one embodiment, after a game is played each game played by the user is evaluated by the system and put into different Rank buckets. Rank buckets are used to separate the records per difficulty. For example, in a battle style game, a record with higher score, more garbage lines sent or more lines cleared will be put into higher Rank buckets, while easier games (lower score, fewer garbage lines sent, fewer line clears) will be put into a lower Rank bucket. Buckets picked by an absolute value (range of score, range of garbage lines sent, range of lines cleared etc.) may be known as an 'Absolute" bucket system. This system guarantees that that record will have a value in the range of the specified criteria. In the case where it is hard to evaluate the user's skill because of luck factors in the design, it may also be possible to use a 'relative bucket system' that determines the difficulty of the game (or the bucket that the game will be put in) by the level of experience of the user. In a relative bucket system, a filter that does not save a game over a certain range of certain criteria can be used to supplement the system. Examples of absolute vs. relative bucket systems are as follows:

Example of Absolute Bucket System:
Scenario A: A battle style game that sends garbage lines or items to opponents
Player A's game where 40 garbage lines are sent===>Game put into Bucket 10
Player B's game where 20 garbage lines are sent===>Game put into Bucket 5
Note that in this case a game with more garbage lines sent will be put into a higher bucket.
Scenario B: a Sprint Style Game
Player A's game cleared 40 lines in 2:00===>Game put into Bucket 5
Player B's game cleared 40 lines in 1:00===>Game put into Bucket 10
Note that in this case a game with a shorter time will be put into a higher bucket.
Example of Relative Bucket System:
Scenario C: A BEJEWELED style game where deviation of score per game is large
Player A was Rank 15 at the moment the user played the game===>Game put into Bucket 15
Player B was Rank 5 at the moment the user played the game===>Game put into Bucket 5

When a user plays a game, a game is retrieved from a bucket that may match the appropriate level of the player. For example, if the player is Rank 5, normally the system will pick a game from bucket 5. But there are also certain cases where the system might pick from a higher or lower bucket on purpose. For example, if the user is having a bad day, and is consistently losing, the system may dynamically provide the user with an easier game, thus giving them a game from a lower bucket than normal. To make some situations more dramatic, or challenging, the game system might pick a game from a bucket that is higher than a player's rank. For random purposes, such as to add the factor of luck, the system might mix in a few higher or lower games than what would match the player rank. Note that in a two-player game, a single game may be retrieved, but as the number of players increases, the number of games needed to retrieve might also increase. For example, in a game like Tetris® Battle 2P, with one opponent, one game may be retrieved, but in a game like Tetris® Battle 6P, with 5 opponents, the game system will retrieve 5 records.

In embodiments, the bucket that a person's game play record is stored in may be determined by the average value of the game's time, amount of garbage sent, lines cleared, etc., in an absolute system, by which rank the player had at the moment the game was recorded in a relative bucket system, and the like.

In embodiments, all the buckets may be empty when the game system is started or opened to game play by live users. To fill the buckets as fast as possible, the system may immediately save each game played by a user of a particular level into the database 140, such as into a database table, creating at least one read access and one write access every time a game is played, and the like. The number of read accesses will increase accordingly if the number of players played against in a game is higher than two. This is the reason the size of the buckets typically are fixed and the reason the system generally may not attempt to save a certain number of games played by each user. Instead, if a user of a particular level plays early and often when the system is trying to fill the buckets, then their game plays will be disproportionately represented in the bucket for their level. Indeed, future users may not have any of their game plays stored at all if the bucket for their level has already been filled. In this configuration, it is difficult for the system to provide a replay of a game played by a selected person for a user to play against. Therefore, it is very difficult to serve games of a specific person to a player.

A game system according to the principles of the present invention, whether client-based, server-based, hybrid-based or other configuration, provides an enhanced user experience where the user not only gets to play an opponent that may not otherwise be available, but the user plays a game with significant interaction with the opponent which creates a real-time gaming style experience.

Figure 3:
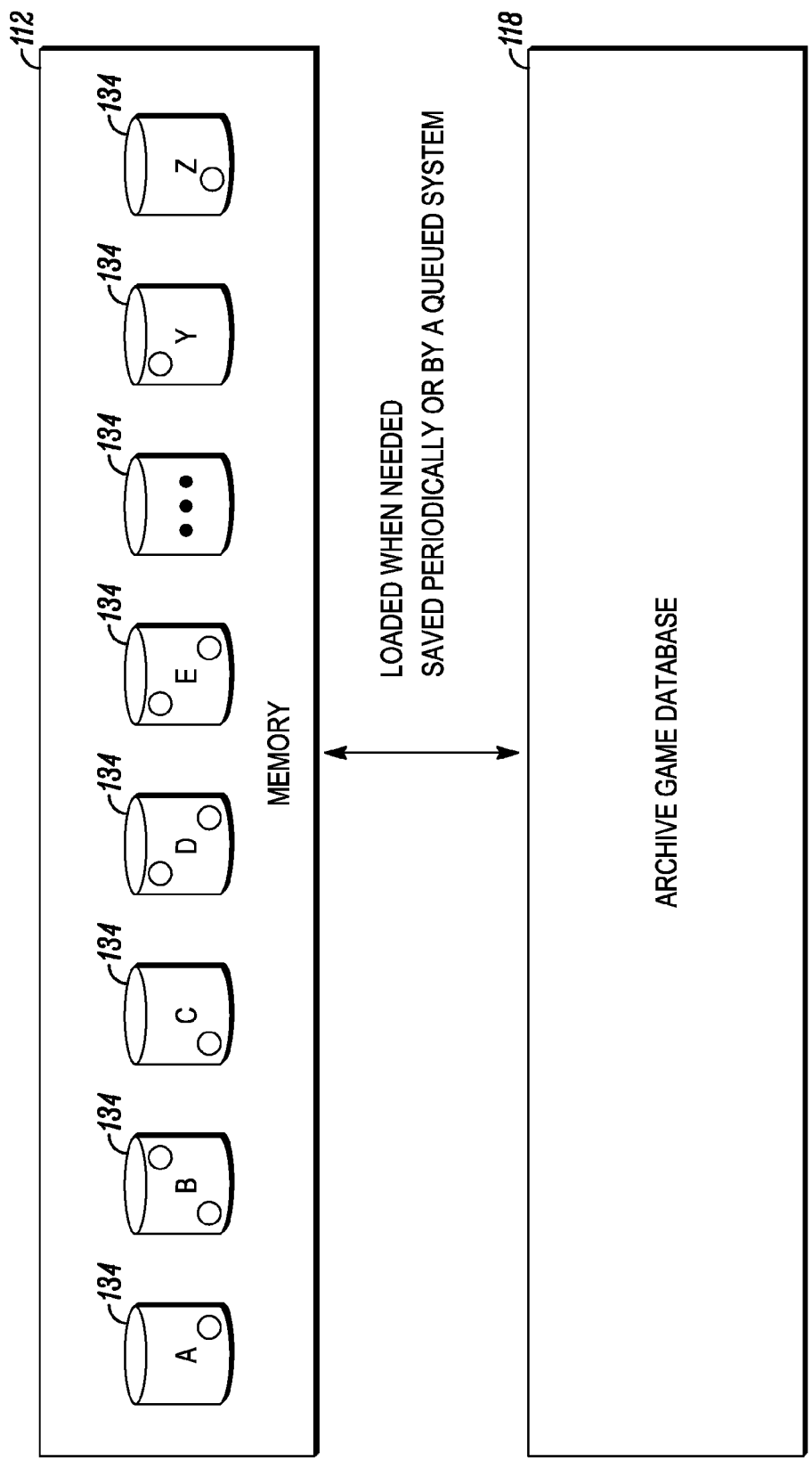
FIG. 3 depicts a method of storing game play data according to an embodiment of the present invention.

An embodiment of the present invention is depicted in FIG. 3. In an embodiment of the present invention the buckets may be personal buckets 134, where each bucket has a game player's profile information associated with it, such as including age, sex, region (e.g. country, state, city), rank, play statistics (e.g. how fast, how many wins), and the like. For example, bucket "A" would be for player "A", bucket "B" would be for player "B" etc. The pre-recorded games, game characteristics, portions of games, and the like, for each user's bucket may be loaded into memory 112A from the database 118A as needed (also referred to as read caching), and the games played by a currently active online user against one or more of the pre-recorded game data are backed up to the database 118A, such as periodically, logged by a queue system, and the like (also referred to as write caching). The personal buckets 134 can hold up to x number of recent games and y number of best games for a particular user. The numbers x and y are variable, and so can be adjusted as needed. Since games played may be stored and managed based on the user data, that information may be utilized to pick out the best match for that person, or filter out the optimal kind of opponents that the person is wishing to play. Reading and writing may be done in a similar fashion to a caching system, where it is not done every game, but done efficiently as needed. This is possible because games played typically are not crucial data, and losing some games played does not become a problem to the user experience in most of the cases.

Figure 4:
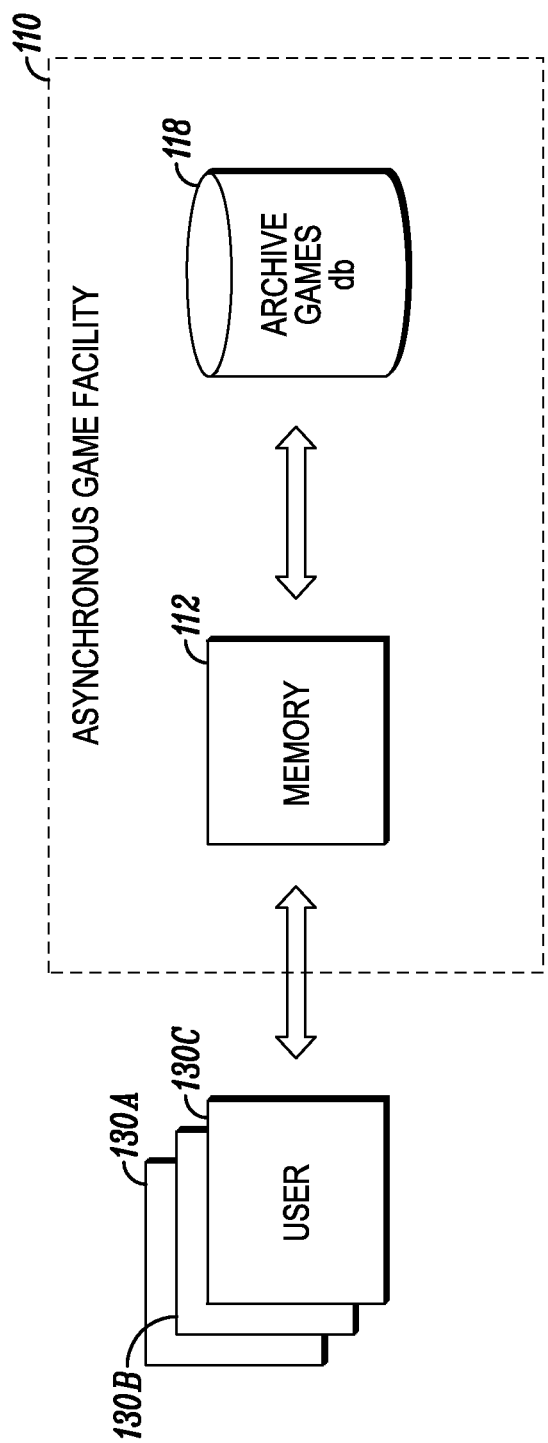
FIGS. 4 and 4A depict the interaction of a user with the asynchronous game facility in an embodiment of the present invention.

FIG. 4 focuses in on several aspects of the present invention that may help to highlight some of the advantages of this configuration. Here, a plurality of users 130A-C are shown interacting with the memory 112. The memory 112 may be a fast access memory, such as RAM, SRAM, DRAM, Flash memory, a hard disk (such as made using flash memory), transactional memory, or preferably some other relatively fast access computer memory known to the art. The memory 112 may access the database 118 only as required for deeper memory stores. Memory 112 may be a form of memory that the asynchronous game server 102 has as a means of temporary storage. The purpose of using memory 112 is to store game data in a memory storage that is directly linked to client 104 servicing, rather than to access the database 118A. This eliminates (or at least reduces) the steps of connecting to the database, retrieving game data, and sending back the information for use. In embodiments, when the server loads up, it reconstructs the buckets into the memory through an array or a linked list. The bucket 134 may, optionally, hold only the pointer to the game or may store the entire game played, and the game could be saved in the memory, by file on the hard drive on the system, outside the server system (when using separate storage server), or the database, and the like. In embodiments, the buckets 134 may be constructed with the defined criteria. Since memory is a form that can be used rather freely, the configuration of the buckets 134 can be changed rather easily, as it does not require a table or structure change as would be the case if it was on a database. In embodiments, the database may, optionally, only act as the source of raw data, and the game server may reconstruct on load, therefore increasing the flexibility of the system. As an online game is normally serviced every day after its first start of service, being able to change these configurations to fit more precisely what the current users want, without the need of long, time-consuming maintenance, is a big advantage. Long maintenance times may translate into a loss of revenue while the game system is not running. Therefore, rapid re-configuration of the bucket is desirable. Once the game is served to a user, several things may happen, such as the game ID being passed to the client. The client may then request the actual game record (replay) data from the server again. In the case where a person is matched up instead of a game, a list of games from that person may be sent to the client, and the client may then request the game.

Figure 2:
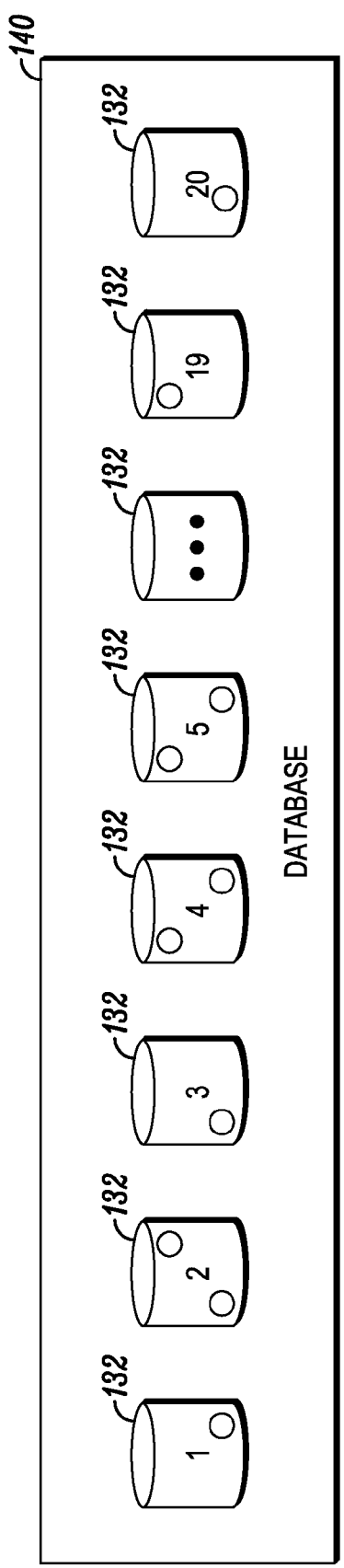
FIG. 2 depicts a method of storing game play data.

Continuing with the description of FIG. 4, the data flow depicted is fundamentally different from the data flow found in alternate embodiments, such as provided in FIG. 2, where a game server provides the game directly from the database 140 to preserve integrity. In the present invention, the asynchronous game server 102 provides the game from the memory 112. If the memory 112 is full, the asynchronous game server 102 may offload some data to the database 118 and queue it in a multi-threaded process in the background. When data is requested that is not in the memory 112, the asynchronous game facility 110 may automatically request that data from the database 118. In embodiments, upon the server 102 start up, the memory 112 could be empty, so the asynchronous game server 102 may load data from the database 118 into the asynchronous game server memory 112, such as with a regulated flow, so that the asynchronous game server 102 is not overloaded. This may provide stability to the service, while still having some form of security by utilizing the database 118 on the background layer. Data not utilized by the memory 112 may be offloaded (e.g. deleted) periodically to make the data management efficient. The form of memory 112 need not be fixed. Instead, the form may be easily altered by changing the code and reloading the data again as needed. This may be more efficient, as the data flow during loading may be regulated.

Here, the memory 112 allows faster access times with the user 130 than alternate embodiments that use direct access to the database 140. For example, one raw performance test on an embodiment yielded the following results:
 BattleGameRecord Request/Send
 Read/Write on DB by Java 23 ms/44 ms
 Read/Write on DB by C++21 ms/14 ms
 Read/Write on Memory by C++8 ms/14 ms
 At least 3 times better in raw performance In embodiments of the present invention however, the database 118 may only be used as an overflow space from memory 112, such as for data that has not been used in some period of time, data that is not being used at the current time, data that has been archived for later use, and the like. The direct use of memory 112 in the present invention has many advantages, and may allow the present invention to not only create a real time like game play environment with a user (against another player who is not, in real life, actively playing with them), but also may allow the present invention to be more easily scalable to a large numbers of users. That is, utilizing the memory 112 may help scalability because database access is relatively costly in terms of connection time. Also, since many services compete for the same resources, the use of the database may be less dependable than memory with regard to access time. Using memory 112 may have a number of advantages since (1) memory is becoming very cheap as a trend while server CPUs are still relatively costly; (2) replay data is relatively expendable, which means that even if the system loses some replay data, it usually will not affect the experience of the user; (3) the server 102 may have a background thread that updates the database 118 at a regulated rate, so that the game data is backed up while reducing the load on the database 118; (4) memory 112 may provide the advantage that it is relatively easy to expand (compared to increasing the processing power associated with the database) and a higher load on the server 102 may not increase the performance exponentially as a higher load on the database 118 because the access speed is relatively fast; and the like. Serving games from the memory 112 may therefore provide higher accessibility (by reducing access time with the database 118), expandability (easier and more cost effective to expand), efficiency (providing better scalability and stability as the performance does not deteriorate at the exponential rate as for database access), flexibility, and the like. In addition, management and manipulation of the data may be relatively easier as well, as the structuring of the data may be manipulated by changing the code, whereas the direct use of a database 140 may require the need to change tables and the data within to change certain settings, such as range of filtering, and the like.

Figure 4A:
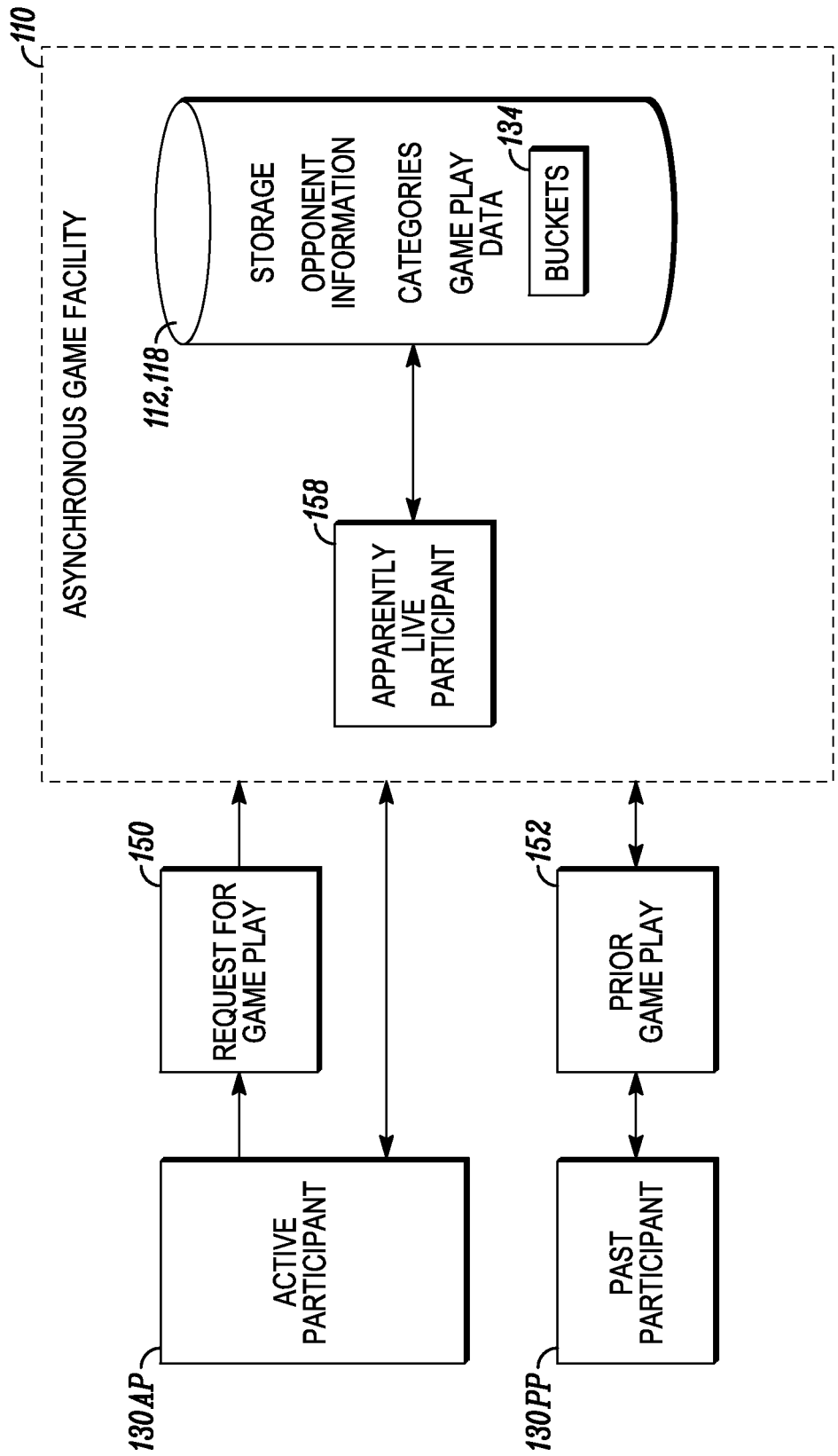

Referring to FIG. 4A, a user 130 may be an active participant 130AP or a past participant 130PP, where the active participant 130AP is a user 130 actively playing a game through the asynchronous game facility 110, and a past participant 130PP is a user 130 that has played a prior game 152 through the asynchronous game facility 110 at some past time, such as earlier in the day, in the week, in the year, and the like. The active participant 130AP may make a request for game play 150 to the asynchronous game facility 110, and the asynchronous game facility 110 may provide an opposing player game to the active participant 130AP as an apparently live participant 158 as provided from the storage 112, 118 in association with the asynchronous game facility 110 as described herein, such as including opponent information, categories of opponent information, game play data, buckets relating game play data to some criteria, and the like.

In embodiments, the present invention may provide for simulated live game play based in part on prior game play 152. For instance, you may be able to play against another player, rather than against 'a computer', but you would be playing against a game from that other player from an earlier time, such as earlier in the day, week, and the like, in a manner such that it appears to the player that they are playing against the other player live. In embodiments, this other person may be someone the player knows, someone they've played against in the past, a friend, and the like. An advantage of this type of simulated live play may include an increased availability of players, decreased wait time when selecting a player or being matched to a player, the feeling that you're being matched against another individual quickly, and the like. In embodiments, the present invention may provide a computer program product embodied in a computer readable medium that, when executing on one or more computers, performs the steps of: (1) receiving a request for game play, (2) in response to the request, causing prior game play data to be retrieved, where the prior game play data was stored in response to prior game play of another user, and (3) in further response to the request, providing an asynchronous game play environment where an active participant, who made the request, is able to play against and interact with, at least more than once during an active period of game play, an apparently live participant based on the prior game play data. In another embodiment, the present invention may (1) receive a request for game play 150, the request including desired opponent information relating to a desired opponent, (2) in response to the request, cause game play data to be retrieved, where the game play data was stored in response to prior game play 152 of a game player that meets the requirements identified by the desired opponent information, and (3) in further response to the request, provide an asynchronous game play environment where an active participant 130AP, who made the request, is able to play against and interact with, at least more than once during an active period of game play, an apparently live participant 158 based on the game play data. In another embodiment, the present invention may (1) receive a request for game play 150, the request including desired opponent information relating to a desired opponent, (2) in response to the request, cause game play data to be retrieved, where the game interaction data was stored in response to prior game play 152 of a game player that meets the requirements identified by the desired opponent information; and (3) in further response to the request, provide an asynchronous game play environment where an active participant 130AP, who made the request, is able to play against and interact with an apparently live participant 158 based on the game play data, and where the interaction causes a change in the apparently live participant's 158 progress more than once before the end of a game presented in the asynchronous game play environment. In another embodiment, the present invention may (1) receive a request for game play 150, the request including desired opponent information relating to a desired opponent, (2) in response to the request, cause game play data to be retrieved, where the game interaction data was stored in response to prior game play 152 of a game player that meets the requirements identified by the desired opponent information, and (3) in further response to the request, provide an asynchronous game play environment where an active participant 130AP, who made the request, is able to play against and interact with an apparently live participant 158 based on the game play data, and where a game provided in the asynchronous game play environment includes a beginning period, an active mid-game period, and an end and the interaction occurs during at least the active mid-game period. In another embodiment, the present invention may (1) receive a request for game play 150, the request including desired opponent information relating to a desired opponent, (2) in response to the request, cause game play data to be retrieved, where the game play data was stored in response to prior game play 152 of a game player that meets the requirements identified by the desired opponent information, and (3) in further response to the request, provide an asynchronous game play environment where an active participant 130AP, who made the request, is able to play against and interact with an apparently live participant 158 based on the game play data, and where the interaction is provided during game play to generate an impression that the active participant 130AP is playing against another live participant.

In embodiments, the present invention may provide for an asynchronous game play architecture, such as to enhance a user's simulated real-time game experience. For instance, memory storing previous game play may be configured in an unstructured and searchable format such that it does not require slower database interaction, using a database to store less frequently accessed or longer term storage of previously played games, being able to directly access memory to allow fast access, and the like. In embodiments, the present invention may provide for a computer program product embodied in a computer readable medium that, when executing on one or more computers, performs the steps of (1) receiving a request for game play 150, the request including desired opponent information relating to a desired opponent, (2) in response to the request, causing game play data to be retrieved, where the game play data was stored in response to prior game play 152 of a game player that meets the requirements identified by the desired opponent information, (3) the memory configured to store prior game play 152 data in an unstructured and searchable format such that it does not require database interaction so as to facilitate access speed, and (4) in further response to the request, providing an asynchronous game play environment wherein an active participant 130AP, who made the request, is able to play against an apparently live participant 158 based on the game interaction data. In another embodiment, the present invention may (1) receive a request for game play 150, the request including desired opponent information relating to a desired opponent, (2) in response to the request, search memory for game play data, where the game play data was stored in response to prior game play 152 of a game player that meets the requirements identified by the desired opponent information, (3) in the event that the game play data is not found in memory, search a data base for the game play data, extracting the game interaction data from the database and loading it into the memory, (4) and in further response to the request, provide an asynchronous game play environment where an active participant 130AP, who made the request, is able to play against an apparently live participant 158 based on the game interaction data. In another embodiment, the present invention may (1) receive a request for game play 150, the request including desired opponent information relating to a desired opponent, (2) in response to the request, cause game play data to be retrieved, where the game play data was stored in response to prior game play 152 of a game player that meets the requirements identified by the desired opponent information, (3) the memory being directly accessible to an asynchronous game processing facility to facilitate high bandwidth and fast access, and (4) in further response to the request, provide an asynchronous game play environment where an active participant 130AP, who made the request, is able to play against an apparently live participant 158 based on the game interaction data.

In embodiments, the present invention may provide for an asynchronous game play architecture, such as to enhance a user's simulated real-time game experience. For instance, game play data may be delivered to a client device for local play, game play data matching a criteria, game play data from a plurality of players matching a criteria, and the like. In embodiments, the present invention may provide for a computer program product embodied in a computer readable medium that, when executing on one or more computers, performs the steps of (1) receiving, at a server from a client, a request for game play 150 data representative of at least one prior game played by people matching a criteria, (2) in response to the request, searching and retrieving the asynchronous game play data and delivering the game play data to the client, and (3) causing the game play data to be stored locally on the client such that the client can retrieve the game play data in response to a request to play an opponent in an asynchronous game. In another embodiment, the present invention may (1) receive, at a server from a client, a request for game play 150 data representative of a plurality of prior games played by a person matching a criteria, (2) in response to the request, search and retrieve the game play data and deliver the game play data to the client, and (3) cause the game play data to be stored locally on the client such that the client can retrieve data representative of at least one of the plurality of prior games in response to a request to play an opponent in an asynchronous game. In another embodiment, the present invention may (1) receive, at a server from a client, a request for game play 150 data representative of at least one prior game played by each of a plurality of people matching a criteria, (2) in response to the request, search and retrieve the game play data and deliver the game play data to the client; and, (3) cause the game play data to be stored locally on the client such that the client can retrieve data representative of at least one of the plurality of prior games played by at least one of the plurality of people in response to a request to play an opponent in an asynchronous game.

In embodiments, the present invention may provide for an asynchronous game storage structure, which may also be referred to as a 'bucketing' structure. For instance, category information may be associated with the game play data in memory, such as through an assessment of the game play data, by storing the game play data with a tag, with metadata, by storing game play data in a plurality of categories, and the like. Criteria may be gender, age, location, difficulty level, score, a game characteristic, friends listing, and the like. In embodiments, the present invention may provide for a computer program product embodied in a computer readable medium that, when executing on one or more computers, performs the steps of (1) in response to receiving asynchronous game play data, identifying a category for which the asynchronous game play data belongs through an assessment of information associated with the asynchronous game play data, and (2) storing the asynchronous game play data in memory along with an association with the category such that the asynchronous game play data can be retrieved based on a request for asynchronous game play with an opponent that matches attributes of the category. In another embodiment, the present invention may (1) in response to receiving asynchronous game play data, identify a category for which the asynchronous game play data belongs through an assessment of the asynchronous game play data, and (2) store the asynchronous game play data in memory along with an association with the category such that the asynchronous game play data can be retrieved based on a request for asynchronous game play with an opponent that matches attributes of the category. In another embodiment, the present invention may (1) in response to receiving asynchronous game play data, identify a category for which the asynchronous game play data belongs through an assessment of information associated with the asynchronous game play data, and store the asynchronous game play data in memory with a category tag such that the asynchronous game play data can be retrieved based on a request for asynchronous game play with an opponent that matches attributes of the category. In another embodiment, the present invention may (1) in response to receiving asynchronous game play data, identify a plurality of categories for which the asynchronous game play data belongs through an assessment of metadata associated with the asynchronous game play data, and (2) store the asynchronous game play data in memory along with an association with the plurality of categories such that the asynchronous game play data can be retrieved based on a request for asynchronous game play with an opponent that matches attributes of any one of the plurality of categories.

In embodiments, the present invention may provide for dynamic difficulty adjustment, such as to improve the players game experience, including adjustment for difficulty level, past play experience, recent wins verses loses, a satisfaction score derived from the player's performance, and the like. In embodiments, the present invention may provide for a computer program product embodied in a computer readable medium that, when executing on one or more computers, performs the steps of (1) receiving a request for game play 150, the request including desired opponent information relating to a desired opponent, (2) in response to the request, evaluating prior game play 152 associated with a requestor of the request to assess the requestor's recent success in gaming to form a satisfaction score, in further response to the request, causing game play data to be selected and retrieved, wherein the selection of the game play data is based on response to prior game play 152 of a game player that meets the requirements identified by the desired opponent information, difficulty level of the game play data is selected based on the satisfaction score, and the like, and (3) in further response to the request, providing an asynchronous game play environment wherein an active participant 130AP, who made the request, is able to play against and interact with, at least more than once during an active period of game play, an apparently live participant 158 based on the game play data.

FIG. 1 illustrates one embodiment of how game data may be organized and transferred, where the asynchronous game facility 110A draws game data from the fast access memory 112A, and where the memory 112A draws and exchanges game data with the slower access archive games database 118A. In embodiments, the memory may contain game data from previously played games, such as the entire game data for game play, portions of game data for game play, only portions that are dynamic for future game play, characteristics of previous game play, prior game metadata, prior game interaction data, and the like. In addition, the asynchronous game facility 110A may have a transfer memory such as the asynchronous games database 114A, where previous player games are ready for transfer to a client 104, as well as providing a memory space for storing game data collected from clients 104 when they connect to the asynchronous game server 102. When a client connects to the asynchronous game server 102, the client 104 may be enabled to download new previous player games from the asynchronous games database 114A, upload new game data as recently played by the user to the asynchronous games database 114A, and request new games to play with specific players, such as available in memory 112A or in the longer term memory of the archive games database 118A. In certain embodiments, the client(s) 104 may download information from the asynchronous game server 102, such that the client(s) 104 can play games in accordance with the principles set out herein even when the client 104 no longer has access to the asynchronous game server 102. In other embodiments, the client 104 may remain connected to the asynchronous game server 102 during game play and the client 104 may use the asynchronous game facility 110A, and other related facilities, on the server side.

In embodiments, the asynchronous game server 102 may be a single processor server, a multiprocessor server or some other type of server as known in the art. The server may be connected to other servers through the internet. Further, the server 102 may include other servers such as a web server, a database server, a file server, a network server and the like and all these servers may together act as an integrated server. Furthermore, the server 102 may include software and hardware that may facilitate the playing of an asynchronous game by the one or more computing clients 104.

In embodiments, the client 104 may want to be matched up to a specific player, such as a friend, and may be enabled to do so through a matching engine 120. In embodiments, the client 104 may want to be matched up for a rematch, to have a round of matches, to match against a plurality of other players simultaneously, and the like. The matching engine 120 may interact with the server-side asynchronous game facility 110A as well as with memory 112A, where the memory 112A may need to retrieve additional game data from the archive games database 118A in order to accommodate the client's request. In embodiments, the matching engine 120 may also utilize a user's friend's list 122, such as on the user's client 104, stored on a third-party environment 108, maintained in the matching engine 120, and the like. The matching engine 120 may also be able to match a user to an opponent based on the user's history, such as past selections, behavior, skill level, and the like. In embodiments, the matching engine 120 may maintain a user play profile to aid in the matching of a user to an opponent, such as when the user does not explicitly select an opponent.

In embodiments, users may access asynchronous games in a variety of ways, including downloading onto their client device 104 from a website, purchasing and loading the game onto their client device 104, accessing the game through the asynchronous game server 102, accessing the game through a third-party environment 108 (e.g. social networking sites, gaming websites, e-commerce sites), and the like. In addition, any of these asynchronous gaming sites may have a friends list 122 that may indicate who the user may want to play a game against, keep prior games from on their client device 104, and the like.

Turning now to the client side, the user may have a client device 104 from which they may play asynchronous games, such as a portable client device, a gaming client device, a computer client device, a navigation client device, and the like. FIG. 1 shows one embodiment of a client device 104, wherein the client 104 may perform similar functions as on the asynchronous game server side 102, such as including a client-side asynchronous game facility 110B, memory 112B, an archive games database 114B, and an asynchronous games database 118B. These functional components may operate as described in the asynchronous game server 102 side, running the algorithm for creating a real-time game experience for a user from game data collected from previous game users, pulling game data from a client-side memory 112B, providing deeper memory storage in the client-side archive games database 118B, and the like. In addition, as in the asynchronous game server 102, there may be an asynchronous game database 118B on the client 104 acting as a transfer memory for game downloads from the asynchronous game server 102, and to store games that have been played by users on the client 104, which may be uploaded to the asynchronous game server 102 when the client 104 makes a connection. In addition, the client 104 may have a user interface to interface with the client device, and a live game user interface through which to play the asynchronous game. In association with the client device 104, the user may also maintain at least one friends list 122B on the client 104, where the friends list 122B may be used to explicitly or implicitly determine what players the user may want to play with. For instance, the client may explicitly select a particular friend for play, such as specifying them by name, pseudonym, player tag, username, and the like. However, if the user does not want to explicitly select their opponent, the asynchronous game facility 110 may 'implicitly' select the opponent based on the friends list, stored preferences by the client 104, derived preferences through the user's game play and past explicit selections, and the like, or allow the matching engine 120 on the asynchronous game server 102 to make the selection.

A specific example may illustrate how the game experience may be perceived during game play through a system that operates in accordance with the present invention. The example is meant to illustrate only one game play situation, and as such, this example is not intended to limit the scope of the invention. A user may log on to their FACEBOOK.COM account and decide that they would like to play a game with a friend. The user may then, within the FACEBOOK.COM interface, select a game and a friend to play with. The user may have selected a game with the intention of playing right away and hoping that the selected friend is online and available to play with. In this example, the friend is not available. Assuming, in this example, that the user's client 104 is connected to the asynchronous game server 102, the client 104 may make a game request to the server. The game request may include information identifying the selected game and the selected opponent. The game request may be presented to the matching engine 120 so the request can be matched with appropriate user information and game information. The matching engine 120 may select prior game interaction data from the memory 112. The prior game interaction data may include metadata identifying the user, user characteristics, prior game identification information, and the like. The matching engine 120, in this example, may rely mainly on the metadata to make the user match. Once prior game interaction data is identified, the prior game play information may be used by the asynchronous game facility 110 during the game play with the user. The asynchronous game facility 110 (whether on the client side 110B or server side 110A) presents the user with the appropriate game and the appropriate opponent. Now, the user may perceive a gaming situation where they are playing the game they selected and is playing, apparently in real time, the opponent selected. Optionally, the system may identify to the user that it is in fact not a real time game. The user may begin playing the game against the selected opponent in this apparently real time environment. The opponent's moves and reactions to what is being presented in the game need not be pre-scripted (a portion, or all, of them may be pre-scripted in certain embodiments); they may be based on the opponent's prior game interaction data. There may be a set of processes occurring in the asynchronous game facility 110 that coordinate the user's interactions with the new game that is playing along with predicting and presenting reactions and actions for the opponent based on how the opponent has played prior games.

In another example, the user may want to play games against friends in the asynchronous gaming environment as described herein but may want to play these games when they are offline or otherwise not connected with the asynchronous game server 102. In this situation some prior preparedness may be needed. When the client 104 is connected to the asynchronous game server 102, the client 104 may make a single game request or multiple game requests and the asynchronous game server 102 may download appropriate matching prior game data to the client 104 such that it can be stored on the client 104 for later use. Now, in certain embodiments, the request from the client 104 may be an explicit request and in other situations the request may be an implicit request. For example, the user may know whom they want to play and what games they want to play and then generate a request to identify and download corresponding prior game play data. This would be called an explicit request because the user generated the request. In other situations, enough information about the user may be known, whether on the client 104 side, asynchronous server side 103, both, or elsewhere, that a prediction of what games and what other users the user would like to play can be made. Then, a request based on the prediction may be automatically generated and sent to the matching engine 120. This would be an implicit request. Once the prior game play information has been downloaded to the client 104, the client 104 can go offline and still play games in accordance with the principles set forth herein. With the prior download of prior game play information relating to the opponents they are interested in playing, they may select a game and opponent and then play the game based on the opponent prior game interaction data anytime, whether they are online or offline. In the offline mode, the client may generally run the game through a local asynchronous game facility 110B. Hybrid real-time/asynchronous systems may also be used and may benefit from the use of an embodiment of the invention.

In embodiments, the present invention may provide asynchronous game control through the server-side asynchronous game facility 110A, the client-side asynchronous game facility 110B, or a combination of the two. For instance, the server-side 102 may offer a significantly larger database of user game data to select from, and so the client may utilize the server-side 102 when connected to a high-speed internet connection. On the other hand, if the client 104 is not connected to the internet 124, or is perhaps connected to a low-speed internet connection, or when the server-side 102 is providing limited bandwidth because of heavy usage, the client 104 may utilize the client-side asynchronous game facility 110B to run the client's asynchronous game. In embodiments, portions of the asynchronous game facility 110 functionality may be performed by the server-side 102, and other portions performed by the client-side 104, where the segmentation of functionality may be determined by performance criteria and connection quality.

In embodiments, an asynchronous game of the present invention may require data to be transferred between the client side 104 and the server side 102. Normally the gameplay may be saved on the client side memory until the full game is played, and then may be uploaded to the server. In embodiments, downloading and uploading of the game-data may only happen before and after the game and not during the game. In an asynchronous situation of the present invention, the game may be state-less, meaning that there is no steady connection between the client 104 and server 102. This may allow the system to be flexible, allowing it to upload and download games at a convenient time when the connection is available.

Figure 5:
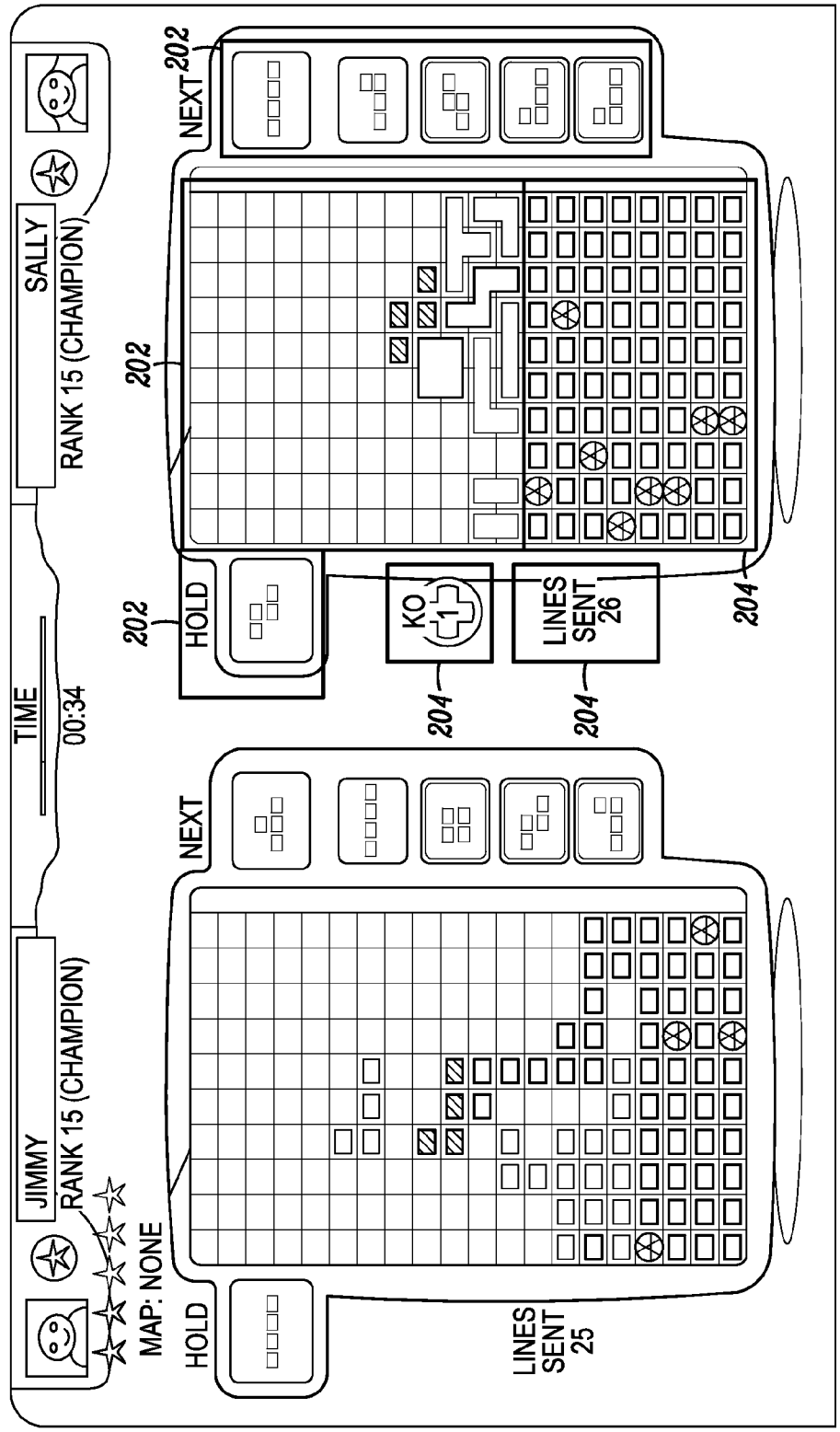
FIG. 5 depicts an example of a Tetris® game, showing the static vs. the dynamic portions of the game's user interface.
Figure 6:
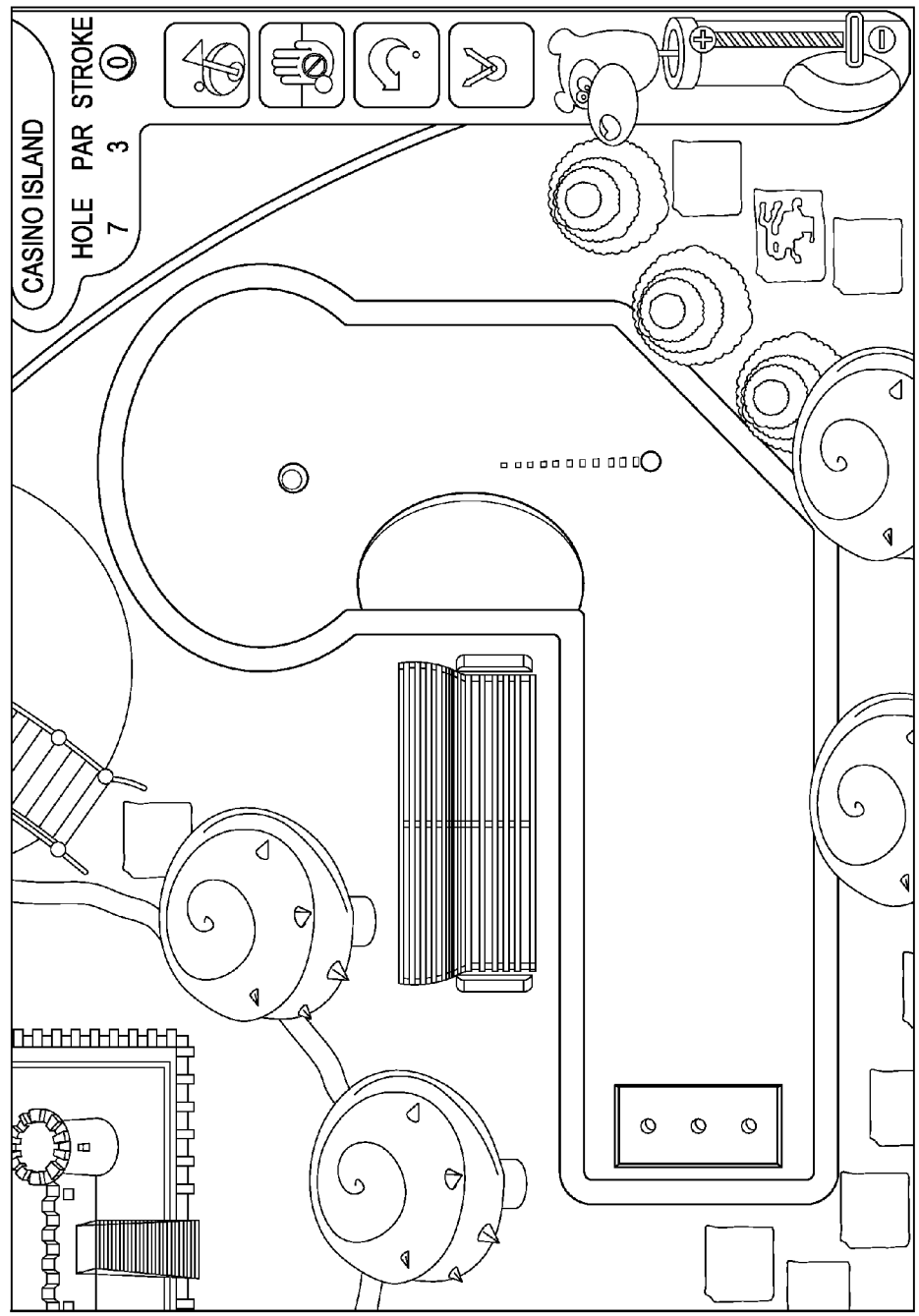
FIG. 6 depicts an example of a game of miniature golf to which an embodiment of the invention could be applied.
Figure 7:
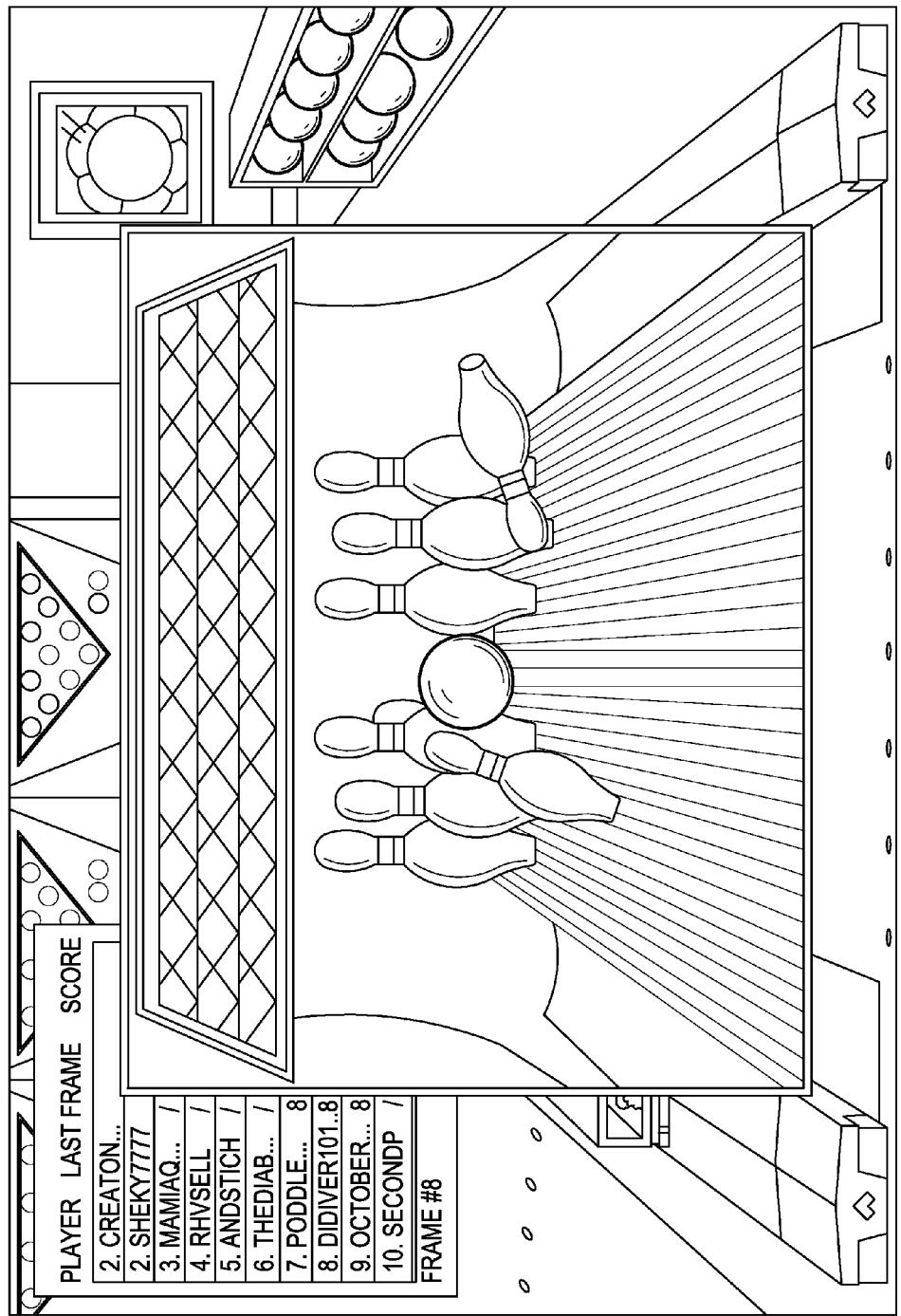
FIG. 7 depicts an example of a bowling game to which an embodiment of the invention could be applied.
Figure 8:
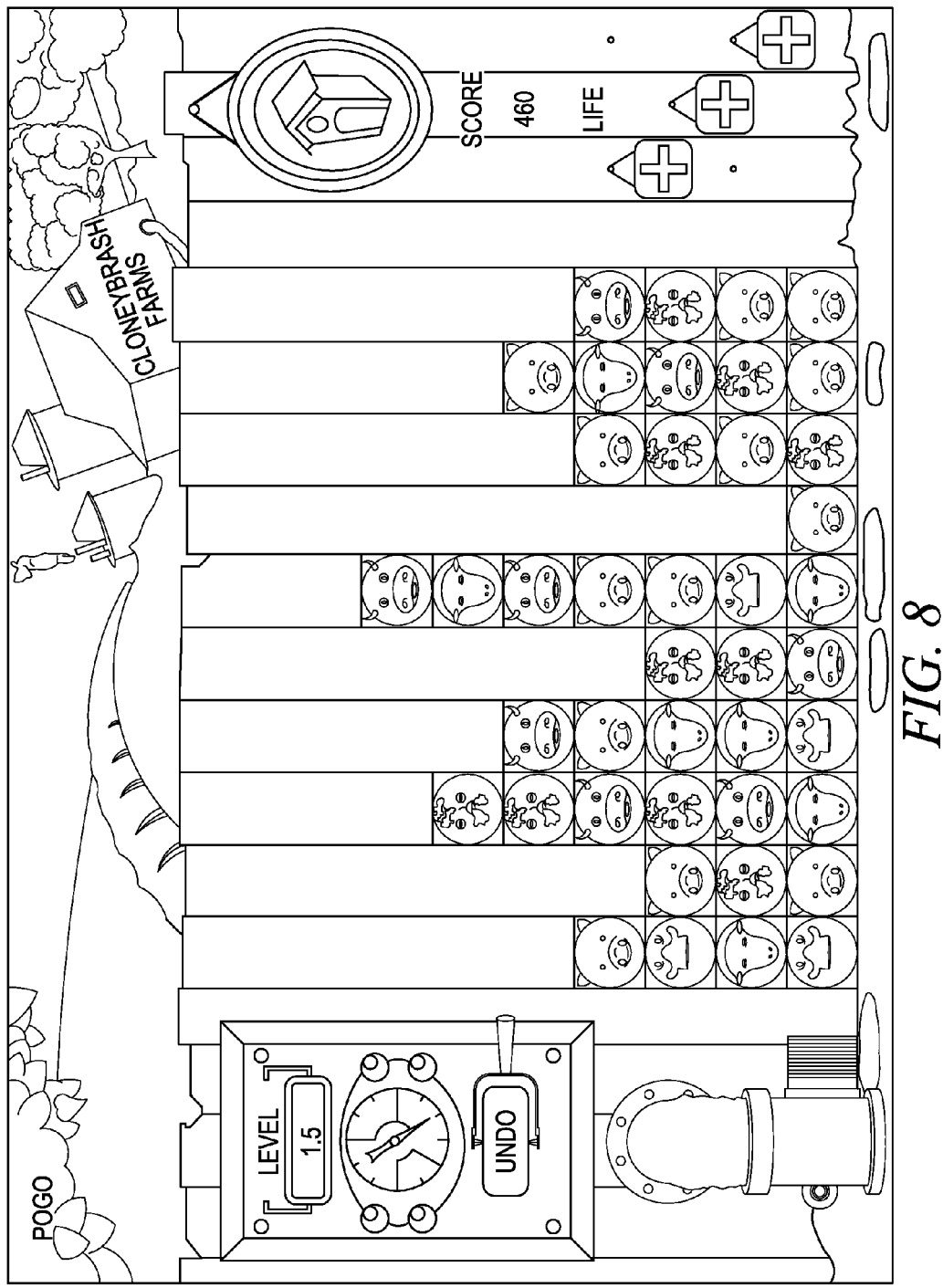
FIG. 8 depicts an example of a puzzle game to which an embodiment of the invention could be applied.
Figure 9:
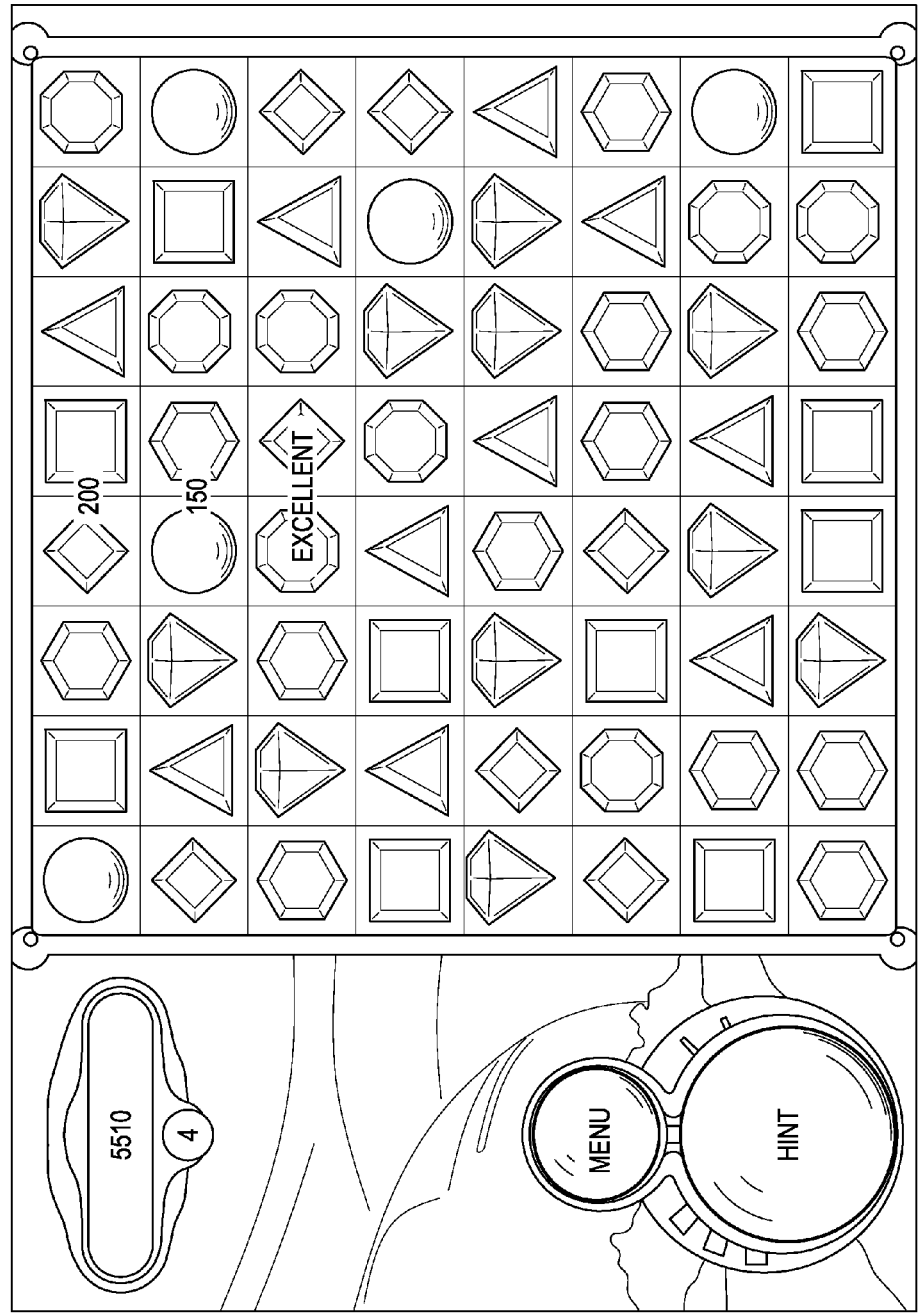
FIG. 9 depicts an example of a puzzle game to which an embodiment of the invention could be applied.

In embodiments, the stored information on a game may be game setting values, general input events, general milestone events, game events, a signature, and the like. A game setting value may enable the game to be recreated with exactly those settings, such as with regard to decoration associated with the game (e.g. Tetrimino looks, ghost looks, sound effects, voice), functionality of the game (e.g. left-right movement, speed, line clear delays, maps used, Random Seeding), and the like. In an example, a type could be a setting, a Tetrimino 'look' could be set to default, a ghost may be a type A, a sound effect may be a type B, a left-right movement may be set to fast, a map may be a type G, a random seed may be 20202032, and the like. A general input event may specify a keyboard, a mouse, a touch screen, a game playing interface, and the like. For instance, in the game of Tetris®, as illustrated in FIG. 5, general settings may normally be set to all keyboard events (or events triggered off of a console controller or handheld system control pad or other keys), but in another game may include mouse (or touch screen) events as well. A more detailed background about the Tetris® game is provided herein. In embodiments, there may be time stamps associated with general inputs. For example, the following time stamps may be associated with a set of Tetris game inputs: 00:00:10 Left, 00:00:35 Right, 00:00:55 Rotate-Right, 00:01:25 Hard-drop, and the like. Note that the embodiments herein are not limited to any one game. Many existing games/game types may benefit from having an asynchronous version in embodiments of the present invention, such as miniature golf (as illustrated in FIG. 6), bowling (as illustrated in FIG. 7), the game of COLLAPSE (as illustrated in FIG. 8), the game of BEJEWELED (as illustrated in FIG. 9), archery, track, swimming, skiing, horse racing, skate boarding, puzzles, the game of ALCHEMY, solitaire games, SHANGHAI-type matching games (e.g. escape, safari), SUDOKU, crossword puzzles, photohunt, the game of POPPIT, the game of TAP TAP REVENGE, skee-ball, mobile phone applications (such as FLING, BACKBREAKER FOOTBALL, FROGGER, TETRIS POP, TETRIS BATTLE), FACEBOOK games (such as MINDJOLT, PACMAN, YOV, PET SOCIETY, (LIL) GREEN PATCH, FARMVILLE, MAFIA WARS), and the like. Other games may be partly adapted to the asynchronous embodiments of the present invention, such as racing, short track racing, and the like. Still other games may not directly benefit from an asynchronous version, but the present invention may be used to create an AI that learns by saving these combinations.

In embodiments, a general milestone event may be included to make sure the game does not go out of sync in certain situations. For example:

| Time Stamp | Type | Parameter |
| --- | --- | --- |
| 00:00:10 | Piece Generated | T |
| 00:00:40 | Lockdown | 2 × 21 |
| 00:01:35 | T-Spin | Success |

In embodiments, a game event may simulate dynamic parts of the game, such as in a Tetris game and how much garbage is sent, the type of garbage sent, the item type used, who used it, and other events like end result, Knock-Out ("KO"), and the like. For example:

| Time Stamp | Type | Parameter1 | Parameter2 |
| --- | --- | --- | --- |
| 00:01:25 | Garbage | Type1 | Size4 |
| 00:02:25 | Item | Type4 | TargetType2 |
| 02:00:00 | EndPosition | 6th | |
| 02:00:00 | ExpAcquired | Experience | +15 |

In embodiments, a signature may be associated with a static and dynamic part of the game. Signaturing optionally may not be a process in itself, but rather a user input may be saved on to the record that acts as a signature of that player. For example, a user might play the same game with somebody, but the way that particular user play's the game, their speed of reaction, movement, etc., may be clear defining factors of that particular user, which will act as a signature (e.g. Tiger Wood's golf swing would be different from another player's golf swing). Thus, recording all the inputs in detail and playing them back may help create the feeling that the user playing against that particular person, such as in a way that may not be replicated by any other player exactly. In embodiments, this may represent the static part of the game, where replays are made to be as close as possible to what actually happened. On the other hand, the dynamic part of the game may be associated with consequences of the game rule that is not the defining part of that player's play. For example, in other games—"Garbages"—or unwanted game items—may be consequences of a player's actions. If the game rules change or situations change, the amount of garbage sent may be changed dynamically in the game, where this change may be seen as a normal consequence of playing.

With regard to static versus dynamic portions of the game play, consider a battle game example as depicted in FIG. 5, where the 202 sections are the static part of the game, and where the locked down position, movement, and the like, may be replicated as closely as possible to how it really happened.

This is meant to create a signature feel of the game giving it a sense that 'Sally' played that game. The 204 sections may be replicated at a lower percentage, such as about 95% or closer to real event. In this example, the 204 sections include how many garbage lines were sent, and the KO will vary from game to game. The bomb triggers may be replicated in certain situations to enhance the feel of that player's play, but may be altered as well. The 204 sections may be replicated sometimes close to the real event, but most of the time will be different, and therefore are considered a dynamic portion of the game.

In another embodiment of the present invention, a hybrid of live play and past play may be implemented. For example, a user may have been playing against other players in the simulated 'real-time' game of the present invention, and notice that one of their friends is suddenly on-line and available to play a true real-time game. The present invention may provide a mechanism for indicating that a friend is on-line, and available to play a true real-time game. In this instance, the friend may now be invited to play a true real-time game. Afterwards, the user may go back to playing simulated 'real-time' games, and even continue to play against their friend through simulated play, after their friend has logged off. In this way, the present invention may implement a 'hybrid' system, allowing a user to intermix playing simulated real-time with players that are not currently on-line, with true real-time games with players that are currently on-line.

In embodiments, the present invention may use a 'state server' to help implement hybrid play that manages all the states of the users logged in to the system, a relay-chat server that acts as the messenger to broadcast the packets real-time, and the like. The system may manage multiple states, such as an active state (e.g. actively playing an asynchronous game), an idle state (e.g. connected but not responding), playing (e.g. playing in real-time with someone, therefore not in the state to be invited), offline, and the like. The client 104 making requests to the server 102 may trigger changes in these states. When requests are made to the server 102 they may become ACTIVE (such as converted from OFFLINE). If the user has logged in (was in an active state), but has not made a request in x minutes, they may be in IDLE. If the player starts to play a real-time game, or a hybrid game with someone, they may convert from ACTIVE to PLAYING (real-time). If the player logs off, or stays IDLE for more than x minutes, they may become OFFLINE. In embodiments, all users may start in OFFLINE. When the player is in the state of ACTIVE, it may be possible to receive INVITES from players to join a HYBRID game. This may be possible because asynchronous games may be interruptible without consequences.

Continuing with a description of hybrid play, in embodiments, if player A creates a game, they may be matched up with pre-recorded games. But if they want to play with someone or a friend that is playing an asynchronous game at the same time, together live, they may be able to invite that person to their game. In embodiments, inviting may cause the invited player's game to be interrupted and a popup to appear asking them if they would like to join that game. If the user does not want to wait until someone invites them to play, or if the user does not want to invite someone in particular to play or want to invite someone, it may be possible to press a "PLAY LIVE!" button and the user could be joined into a live game that has been made slots available for live joins. The system may be more efficient if the asynchronous games have a fixed time, making it easy to predict and match this process. When the user joins a HYBRID game, the asynchronous game data may be downloaded before game play starts. Between the live players, the packets of the game play may be broadcasted to the players right away through a 'RELAY SERVER.' The 'RELAY SERVER' may also act as the 'CHATTING SERVER' sending the chat packets to the live players as well. The packets sent include information that is saved up to from the replay data, with the exception that it may be sent in parts, right away, instead of waiting until the end of the game. At the end of the game, the live players may also send the game data to the server again to be saved, and then used for other games. Alternately, the server may start collecting those packets and save it together at the end of the game.

In embodiments, the advantage of this system may be that the wait to play someone live is minimized, enhancing the accessibility of the whole system. While the "pure" live-games quality of experience may change with the number of users, asynchronous games of the present invention may help ensure that the player will have a quality experience, evenly matched game-play, and the like, while minimizing the wait. Being able to invite players playing single or asynchronous games may also increase the probability of these games occurring because, at least virtually, most of the players are able to be invited. It may also be used to expand into an asynchronous tournament system where a tournament can happen without all the restrictions and limitations normally associated with live play. In embodiments, the present invention may allow and provide for live and previously played games to be mixed in one game, provide for state-management, provide for dynamic invitations, minimize or eliminate waiting, make it easy to play with other players that the user knows, play cooperative games, provide for greater expandability, and the like.

In embodiments, the present invention may utilize sampling and synthesizing theory, where there may be multiple layers, such as in a normal asynchronous situation, in synthesized game play, and the like. In a normal asynchronous situation, the game replay is a "Sampling" result of the user's play. But the game "experience" is a synthesized experience where the 'sampled' game play is used to create a new synthesized experience. For example, the system could record a game, and use the game data to create a replay game, or even from a single game, and use that as the 'sampled' game play to create a new synthesized multiplayer game experience. In an analogy, this may be considered as like an orchestra where each individual instrument is recorded individually, but then played together into one music/song by combining the sampled tracks to become a new song. In embodiments, it is technically possible to create an orchestra game, where a user will play the music or sing live, while the other players are played from a recorded game. For example, a ROCK BAND or GUITAR HERO game could be synchronized as well. A user could be playing the drums, for example, actively, in a band with friends, or other users, or the computer or some combination thereof, playing other instruments (or providing vocals) based on the pre-recorded activities of one or more of such other players. They do not all need to actually play the game at the same time in order to have the experience of playing together as a band. The session of the active user could also be recorded and used in future sessions either by that user or other users, each of which could be different. Thus, such embodiments would provide both iterative and expanding levels of interactivity.

In typical situations, the present invention may try to simulate the crucial parts of the game play as much as possible. However, there may be situations where the system may be put into a situation where it is impossible to avoid de-synchronization. For instance, there may be situations where there are "items" that affect the game play. The challenge here is that the system can have the item being used, but we may not be able to change the outcome of a replay without desynchronizing it. For example, there may be an item called "BLIND" that is being used in the game, such as in the game Tetris®. A player against whom the "BLIND" item is used will be affected by it because they cannot see their play. But the replay cannot react because it is a game that has already been played. Instead, in an embodiment of the invention, the system could synthesize (simulate) the consequence of the use of the "BLIND" item. In embodiments, in this case, the consequence may be that the game play is slower. Here, the system may collect data to use to determine how the use of the "BLIND" item should affect the game play. For instance, if the item "BLIND" is used upon a particular player, the system could determine how much it would affect their particular game play. For example, BLIND (covering the screen) may on average slow play down 30%, "LOCK" (restricting rotation) may on average slow the system down 20%, "TWIST" (twisting the matrix) may on average slow the system down 50%, "PUZZLED" (need to complete a sequence to recover) may on average take five seconds, and the like. By this data, for example it may be determined that if a player or the system used the item BLIND on another particular Player, that Player would be slowed down 30%. When the player uses BLIND on another player's replayed game, the other player's replayed game will be slowed down 30% (playing at the speed of 70%). If the player uses item "PUZZLE" on player A, B, C and for Player A it takes average of 3 seconds to recover the system may stop the replay of Player A for 3 seconds. For Player B it takes average of 5 seconds to recover the system may stop the replay of Player B for 5 seconds. For Player C it takes average of 7 seconds to recover, the system may stop the replay of Player C for 7 seconds. Therefore, the same item may be used on multiple people, but the consequence of it might be different for each player because the system is simulating their recovery.

In another example, consider an asynchronized game in a method of the present invention, for example the game of MARIO KART from NINTENDO. The MARIO KART game might have an item called 'Banana' that could be used on another player. When live Player A leaves a 'Banana' item, and the non-live (recorded) Player B hits the Banana item, the system may make the Player B spin or move in a strange manner for x seconds until they move back to their normal condition. The average x seconds of time may be measured using data from when the Player B has played live and been hit with the "Banana" item, and the system may slow down or stop the replay for x seconds simulating the consequence of that item.

In embodiments, it may also be possible to synthesize other preferences as well, such as for targeting, help, item usage, trigger hit ratio, and the like. For example, for targeting, does the person like to target the weakest player or strongest player? Do they provide a response and take revenge on attacks, and the like. For help, do they like to help their team-mates in team games, or do they prefer to knock out the opponent. For item usage, how often do they use items? For trigger hit ratio, how often do they hit trigger points?

Having described embodiments of the present invention, we turn now to a number of process flow diagrams that illustrate various aspects associated with how the present invention may enable a real-time like interactive asynchronous gaming experience.

Figure 10:
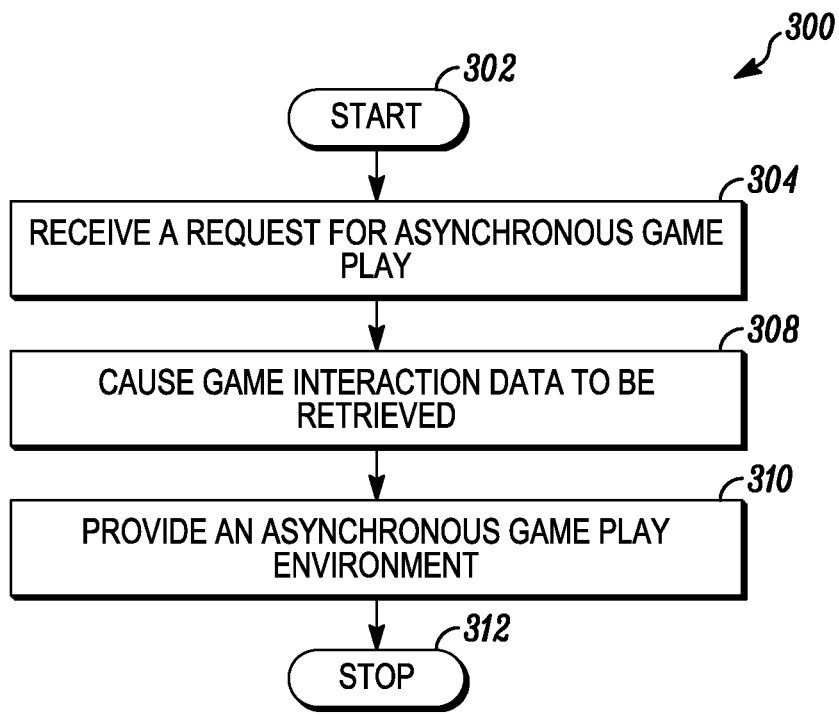
FIG. 10 depicts a flowchart of asynchronous game play against a desired opponent in accordance with an embodiment of the present invention.

In one embodiment of the present invention an asynchronous game play may be played against a prior game player. Referring to FIG. 10, methods and systems for playing a game may be provided. The process 300 may start at step 302 and immediately move to step 304. At step 304, a request for playing an asynchronous game may be initiated. The asynchronous game may allow one or more players to play the game in an offline mode, thus creating an illusion of a real game. The player may perceive that the game is being played online. The players may make a move in the game at any point of time, whenever they are online.

The request may include metadata for the type of opponents desired by the player. In embodiments, the metadata may include other information relating to an asynchronous game such as desired level of difficulty, number of stages, number of rivals and the like. In response to the request for playing the game, at step 308, the process 300 may retrieve the game interaction data corresponding to prior games data that may be stored in the memory. A software-implemented matching facility may identify suitable matches for the type of opponent desired by the player. The available information corresponding to the types of opponents may be utilized at step 310 for initiating an environment for playing the game. The environment may provide the player with a live game against the desired opponent as requested.

The process 300 may end at step 312.

Figure 11:
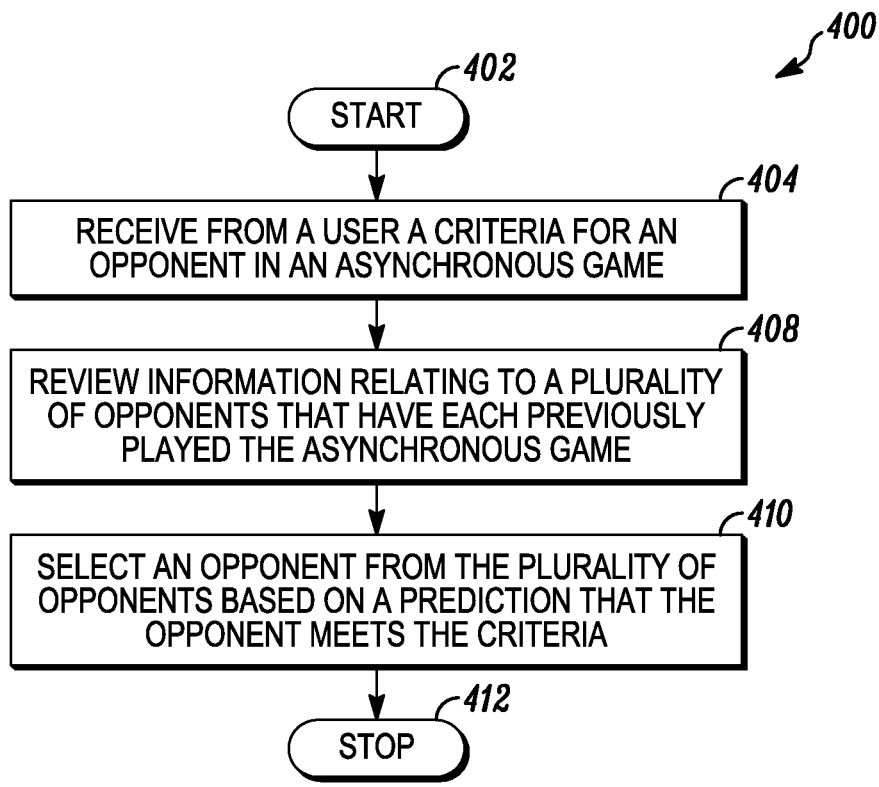
FIG. 11 depicts a flowchart of asynchronous game play against a desired opponent based on the prior game play information in accordance with an embodiment of the present invention.

In one embodiment of the present invention an asynchronous game player opponent may be selected from prior play information. Referring to FIG. 11, systems and methods for selecting an asynchronous game player opponent from prior game information may be provided. The process 400 may start at 402 and immediately move to step 404. At step 404, a request for playing an asynchronous game may be received. The request may include a criterion describing the type of opponents. For example, the player may be interested in selecting an opponent equipped with moderate weaponry in contrast to an opponent with large weaponry in an online combat game. At step 408, information for one or more opponents may be retrieved and reviewed to match criteria provided at step 404. The information may include one or more opponents who had previously played the game.

At step 410, one of the opponents may be selected from the list of one or more opponents that satisfies the criteria provided by the player. The selected opponent may act as an adversary or an opponent against the player.

At step 412, the process 400 may end.

Figure 12:
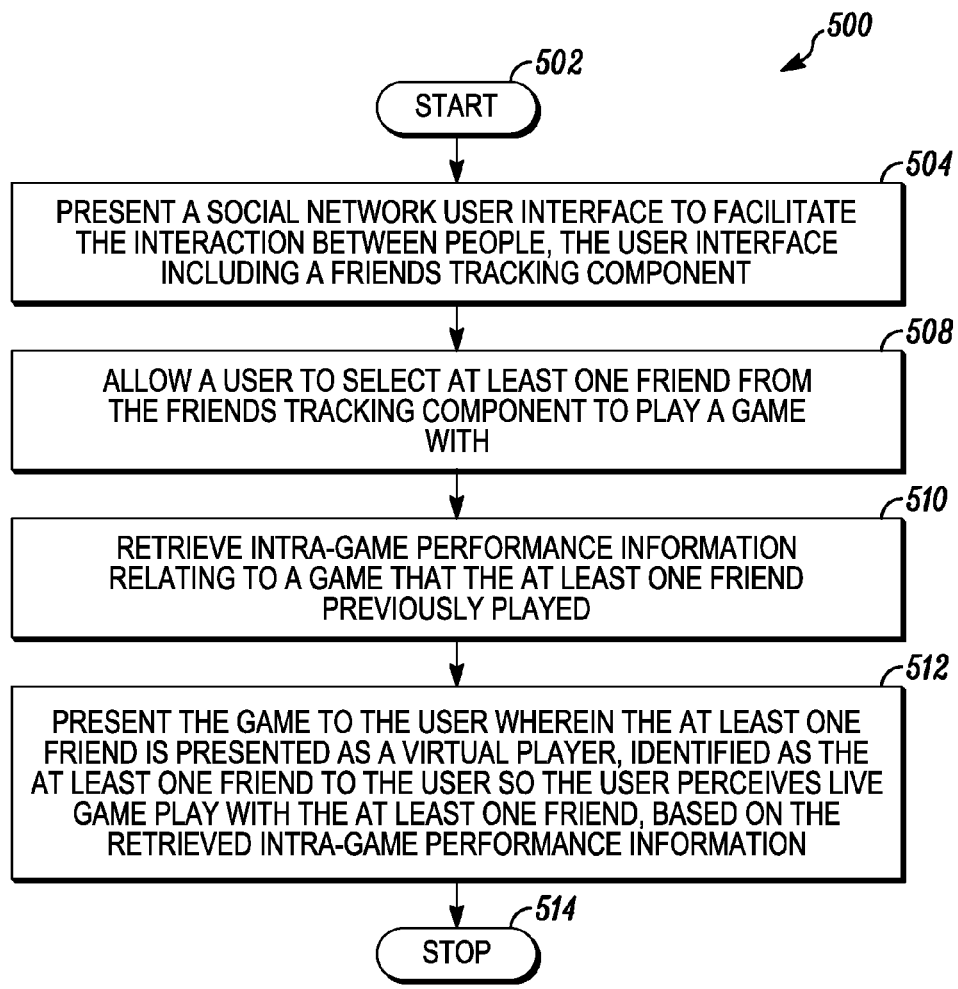
FIG. 12 depicts a flowchart of asynchronous game play against friends in accordance with an embodiment of the present invention.

In one embodiment of the present invention an asynchronous game may be played with friends that are not available. Referring to FIG. 12, systems and methods for playing an asynchronous game with friends that are not available at a particular instant of time may be provided. The process 500 may start at step 502, and may immediately proceed to step 504. At step 504, the process 500 may present a social network interface to a player. The social network interface may list all the people enrolled in the social network including all contacts that are directly or indirectly associated with the player. In addition, a tracking software component associated with the social network user interface may provide tracking of friends, peers and other types of contacts linked to the player. The interface may facilitate interaction of the user with friends, peers, professionals and other direct contacts. For example, the player may classify friends into various categories based on previous interaction and their hobbies. In this scenario, all the friends linked with the player and having 'online gaming' as their hobby may be tracked.

At step 508, the user may invite one of the friends to play a game. For example, the user may identify a friend X from the list of friends being tracked and categorized under online gaming as his/her hobby.

At step 510, determination may be made to identify if the one or more friends are available for playing the game. If none of the friends are available, intra-game performance information of the one or more previous games may be retrieved. This information may be related to the one or more friends who had earlier played the game. The period may be an hour, a day, a week and the like.

At step 512, the player may be presented with a gaming environment. The information retrieved from intra-game performance may be represented as a virtual player. The virtual player may be presented as one of the friends in the social network interface. The player may consider this virtual player as his friend in the game.

At step 514, the process 500 may end.

In embodiments, the game may be a multiplayer game, and the information corresponding to plurality of players may be presented to the user as a plurality of virtual players. This may produce a virtual multiplayer environment and the move of each player may be obtained from the previously stored game information associated with each of the friends; this may provide an illusion of a real time online multiplayer game to the user who may perceive multiple friends playing the game online.

Figure 13:
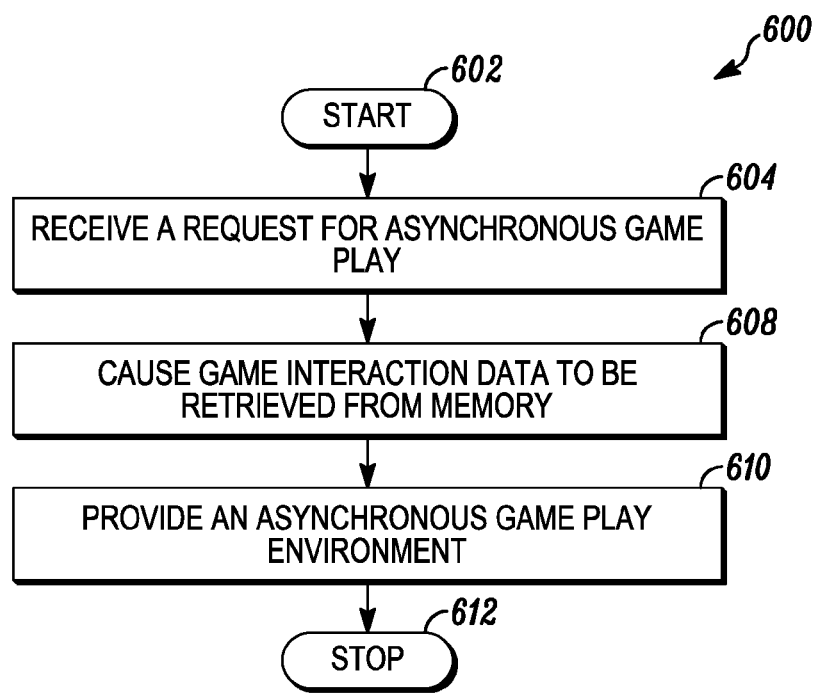
FIG. 13 depicts a flowchart of asynchronous game play using memory in accordance with an embodiment of the present invention.

In one embodiment of the present invention an asynchronous game play may use memory. Referring to FIG. 13, systems and methods for playing an asynchronous game using memory may be provided. The process 600 may start at step 602 and may immediately move to step 604. At step 604, a request for playing an asynchronous game may be received. The request may include information about the type of opponent that the player may be interested in. Apart from the information about the type of opponent, the player may provide various parameters representing information about the opponent such as size, fire power, weaponry and the like. For example, the user may be interested in selecting a small adversary with fast mobility in a combat game.

At step 608, in response to the request from the player, the game interaction data may be retrieved from the memory. This game interaction data may correspond to previous games played by other players such as a second or a third player. In addition, the retrieved data may include the type of opponent desired by the player. A matching software component may retrieve game interaction data that matches the criteria set by the user.

At step 610, the player may be provided with a gaming environment. The player may then play the game against an opponent that may be instantiated based on the intra-game performance information data stored in the memory. The opponent may provide a perception to the player of a real-time gaming.

At step 612, the process 600 may end.

Figure 14:
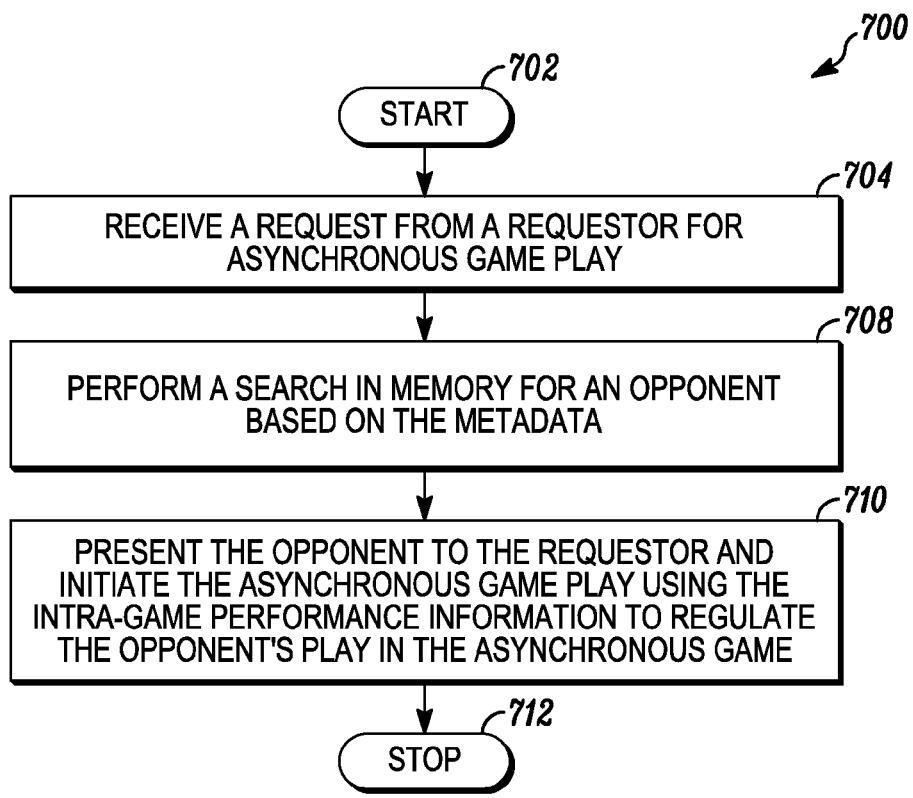
FIG. 14 depicts a flowchart of high bandwidth gamer for asynchronous game play using memory in accordance with an embodiment of the present invention.

In one embodiment of the present invention a high bandwidth gamer matching may be used for asynchronous game play using memory. Referring to FIG. 14, the systems and methods for playing an asynchronous game with another player configured to a high bandwidth using memory may be provided. The process 700 may start at step 702 and may immediately move to step 704. At step 704, a request for playing an asynchronous game may be received. The request may include information about the type of opponent that the player is interested in. Apart from the information about the type of opponent, the player may provide various parameters representing information about the opponent such as size, fire power, weaponry and the like. For example, the player may be interested in selecting an adversary with high fire power but fixed to a particular location in a combat game.

At step 708, a search may be conducted in the memory for an opponent based on the requested data. The memory may hold information about a plurality of players who had previously played games and the opponent information was similar to that desired by the player. A matching software component may search for games matching the criteria for the type of opponent desired by the player.

At step 710, the user may be presented with a gaming environment with the desired opponent. The gaming information obtained from the matching software component may be used for adjusting the moves of the opponent in the game. For example, the moves of a player who played a game with a similar opponent recently may be captured, stored in memory, and later replicated to regulate the moves in the gaming environment of the user.

In embodiments, the opponent may quickly make a move in response to the move made by the player. This may be facilitated as the selected opponent may be configured on a high bandwidth connection and the computing device may receive the move of the player simultaneously due to high bandwidth of the connection.

At step 712, the process 700 may end.

Figure 15:
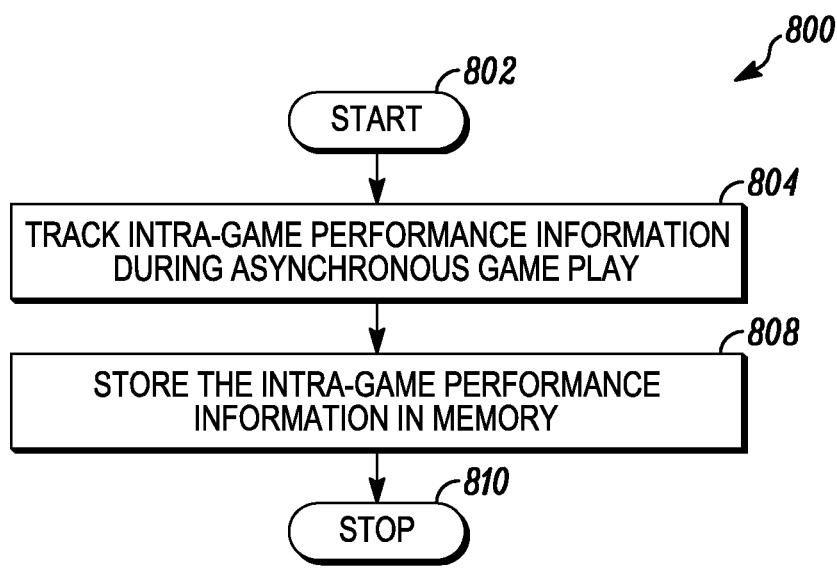
FIG. 15 depicts a flowchart of storing the game play sequence in a memory in accordance with an embodiment of the present invention.

In one embodiment of the present invention, storage in memory may occur after asynchronous game play. Referring to FIG. 15, the systems and methods for storing the intra-game performance information in the memory after an asynchronous game has been played may be provided. The process 800 may start at step 802 and immediately move to step 804. At step 804, tracking of intra-game performance information may be initiated. The tracking may be performed based on one or more parameters including moves made in hostile situations, response to opportunities, and information about moves made in particular situations. For example, player X may avail all the opportunities provided to him/her in a game. Further, player X may respond by initiating a series of flanging attacks on the opponent in an adverse situation and may emerge as a winner.

At step 808, the intra-game performance information may be stored in the memory. The memory may be coupled with graphics facility 214 at the server and may be accessed using software and hardware as known in the art. The memory may be configured on a high bandwidth bus inside the server 102 or in the computing device. Such a configuration may result in fast access of data from the memory. For example, the gaming facility may include a processing facility such as a processor, microprocessor and the like, which in turn may be coupled to the memory through a high speed bus. The high speed bus may facilitate fast transfer of data between the processing facility and the memory.

Finally, the system process 800 may end at 812 after transferring intra-game performance data to the memory.

In embodiments, the memory may be a buffer, a flip-flop, a flash memory, a ROM, a RAM, a CD-ROM, a DVD, an EEPROM, a PROM and the like. Further, the memory may be associated with a circuitry in one or more servers and the memory management may be performed using well known algorithms as known in the art without deviating from the scope and spirit of the invention.

Figure 16:
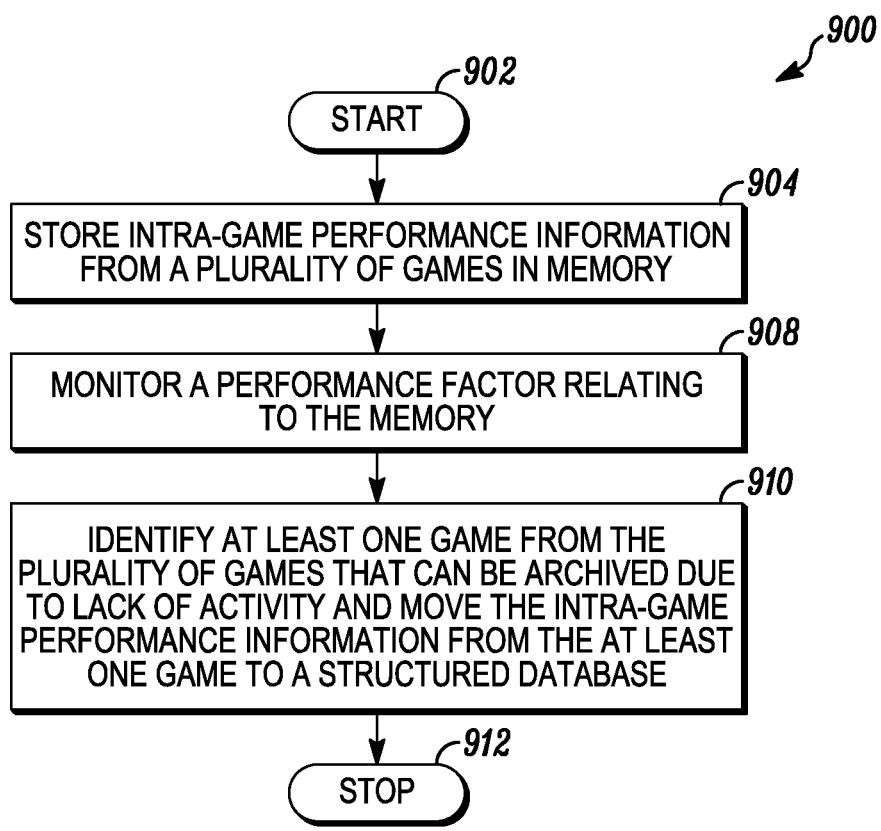
FIG. 16 depicts a flowchart of an overflow of game play sequence stored in the memory in accordance with an embodiment of the present invention.

In one embodiment of the present invention, overflow of game data may be transferred to a database from memory. Referring to FIG. 16, the system and methods for storing gaming performance in the database may be provided after the memory fails to accommodate additional data. The process 900 may start at step 902 and may immediately move to step 904. At step 904, the game performance data may be stored in the memory. For example, the game performance data corresponding to player X may be stored in the memory. Similarly, player Y's performance may also be stored in the memory. This may result in the memory getting full due to accumulation of data in it. The memory may be coupled to other software and hardware that may facilitate transfer of data to and from the memory at high speed. Further, the hardware and software may be configured to facilitate high bandwidth for users playing the game.

At step 908, the process 900 may monitor the performance factor associated with the space available in the memory. For example, the memory may be of limited capacity and when the plurality of intra-game performance information is stored, a large part of the memory may get occupied leading to degradation of memory.

At step 910, the degradation factor of the memory may be assessed. Subsequently, to reduce the utilization of memory and to free some space, one or more games that have been inactive for a long period of time may be identified. The one or more identified games may then be archived into a structured database.

In embodiments, the one or more games may be identified based on a plurality of factors including first-in-first-out, last-in-first-out, most recently used and the like. These and other algorithms for memory paging are well known in the art.

At step 912, the process 900 may end.

Figure 17:
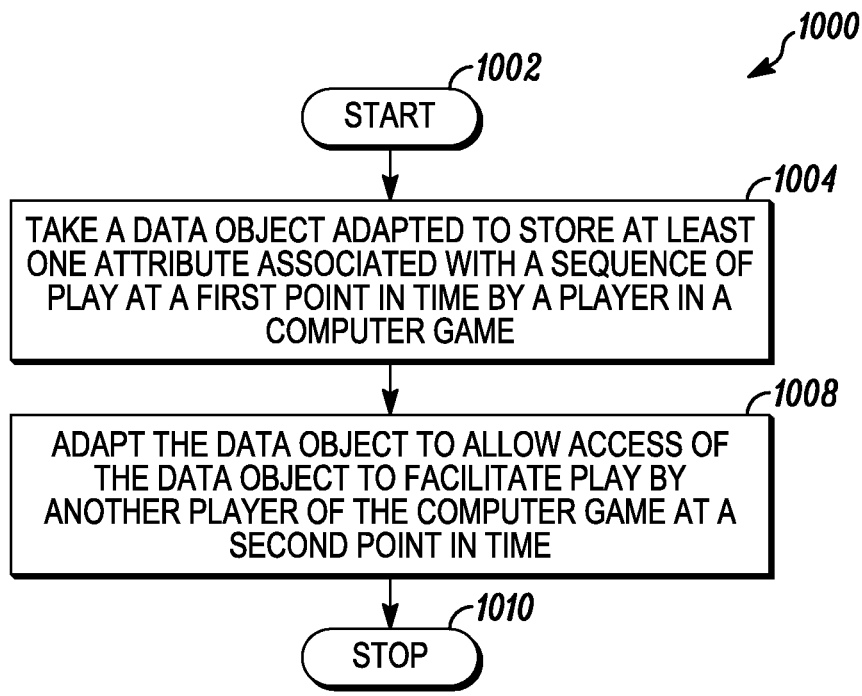
FIG. 17 depicts a flowchart of game play sequence data object for asynchronous game playing in accordance with an embodiment of the present invention.

In one embodiment of the present invention a game play sequence data object may be adapted to enable asynchronous game play. Referring to FIG. 17, a process 1000 depicting game play sequence data object for playing an asynchronous game may be provided. The process 1000 may start at step 1002 and immediately move to step 1004.

At step 1004, a data object such as a buffer, a link-list, a graph and the like may be utilized for storing one or more attributes for a user (first player) playing a computer game. The one or more attributes may be stored at fixed intervals of time or may be continuously stored as and when the data object is available.

At step 1008, the data object may be accessed by the process 1000 by a shared lock or some other mechanism to share the data stored in it with a second player. The process 1000 may provide access to the game play sequence data object to a second player at time T2 (T1<T2) for playing the game, when the user (first player) had already played the game at time T1. Furthermore, one or more attributes and/or events of the game played by the second player at time T2 may be based on the one or more attributes of the game played by the first player at time T1. For example, the first user X playing the game may store the moves in a data object at time T1. Subsequently, at another point T2, a second player may play the game and the moves associated with the game may be accessed from the data object. This will allow a second player to play the game based on the one or more attributes and events of the game played by the first player.

At step 5010, the process 1000 may end.

In embodiments, the data object may be based on one or more game sequences played by the one or more players at a particular point in time.

In embodiments, the data object may be adapted to reflect tendencies based on a plurality of game play sequences.

In embodiments, the data object may be adapted to be based on a prediction of game play based on past game play sequences.

In embodiments, the data object may include a facility for simulating sequences of game play based on past game play sequences.

Figure 18:
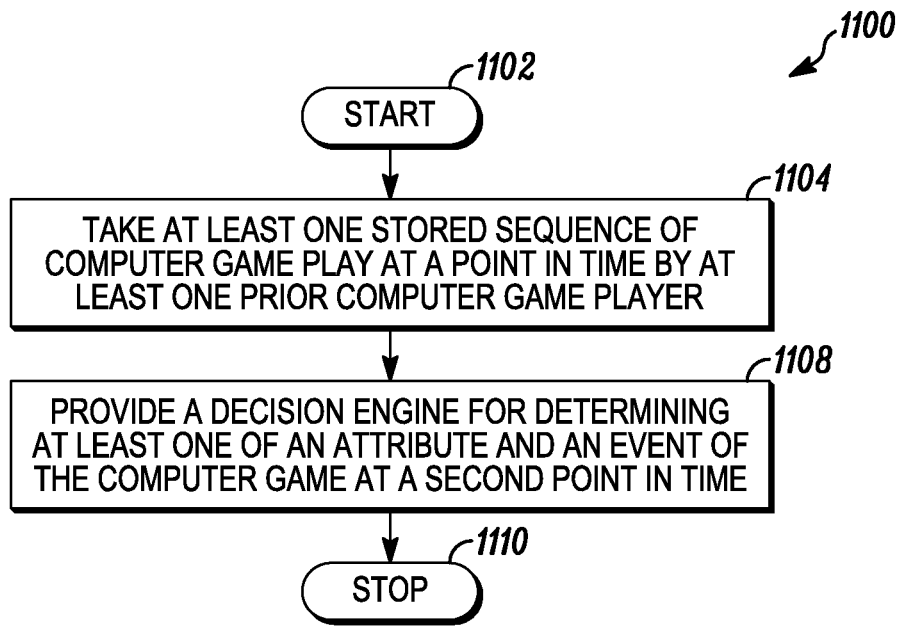
FIG. 18 depicts a flowchart with a decision engine for real time game playing in accordance with an embodiment of the present invention.

One embodiment of the present invention may provide for a decision engine for enabling real time game play against a player based on stored games of another player or other players. Referring to FIG. 18, the process 1100 may provide a decision engine for playing a real time game against a first player based on stored games played by other players. The process 1100 may start at step 1102 and may immediately move to step 1104. At step 1104, one or more sequences of a game played by one or more players at time T1 may be accessed.

At step 1108, a second player may play the game at some other time T2, where time T1<T2 or the event T1 has happened before T2. The process 1100 at step 1108 may utilize a decision engine to determine one or more attributes and/or one or more events associated with the game played by the second player. The decision engine may regulate the sequence of moves in the game played by the second player at time T2. Further, the decision engine may create a perception of real time play for the second player based on game information stored at time T1.

In embodiments, the one or more sequences associated with the plurality of players may be combined by the decision engine to create a new move, thus creating a higher difficulty level. Various algorithms as known in the field of artificial intelligence may be utilized for creating a new move from the sequence of moves associated with one or more players as known in the art.

At step 1110, the process 1100 may end.

Figure 19:
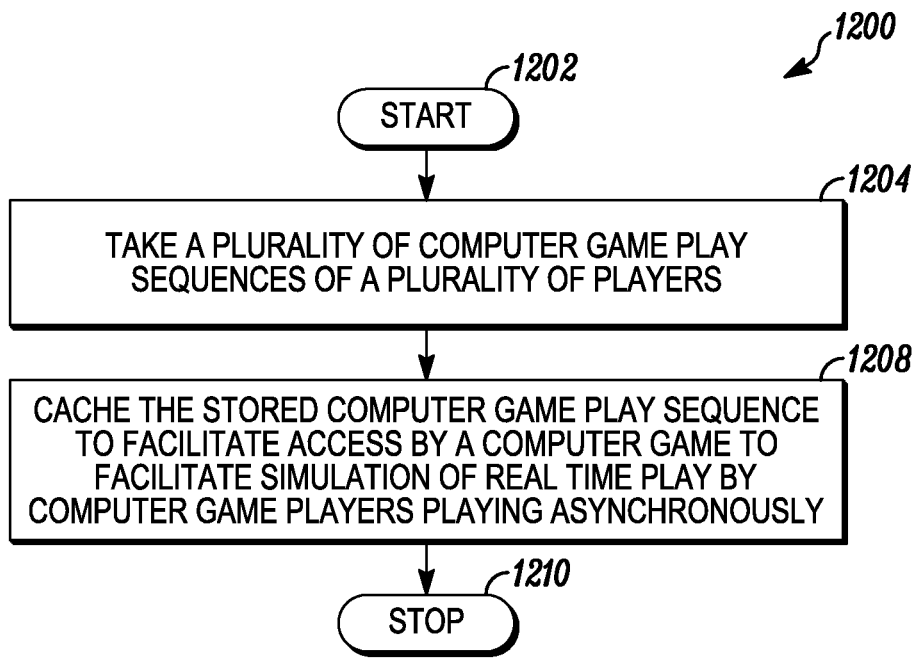
FIG. 19 depicts a flowchart for optimizing cache of a game play sequence in accordance with an embodiment of the present invention.

One embodiment of the present invention may optimize caching of game play sequences. Referring to FIG. 19, methods and systems for optimized caching of game play sequences may be provided. The process 1200 may start at step 1202 and may immediately move to step 1204. At step 1204, the process 1200 may determine and/or store one or more game play sequences performed by one or more players, while playing the asynchronous game. For example, player X may play the game and the moves of the game play sequence may be cached in the memory or some other type of memory. Likewise, moves made by a different player Y may be stored in the memory or in some other type of caching mechanism.

At step 1208, the stored game play sequence associated with a first player may be cached in the memory. This cached sequence of games may facilitate simulation of game in the asynchronous gaming environment. Further, the cache sequence of game may be optimized for fast retrieval using various algorithms as known in the art. For example, the process 1200 may cache the game play sequence of the player X in the memory using POJO caching, HTTP response caching, JSP caching, ORM data access caching and the like for fast retrieval of game sequence. In addition, caching of the game play sequence of a player may give an illusion of the game being played online.

At step 1210, the process 1200 may end.

In embodiments, the optimization of caching may ensure availability of stored game sequences for each of a population of players, ensure availability of stored game sequences for each of one or more game types, ensure availability of stored game sequences for one or more of game types played by a plurality of players, be based on historical selection of an opponent by a game player, be based on historical selection of a game type by a game player, be based on a prediction of selection by a player of one or more of an opponent and a game type, and the like.

Figure 20:
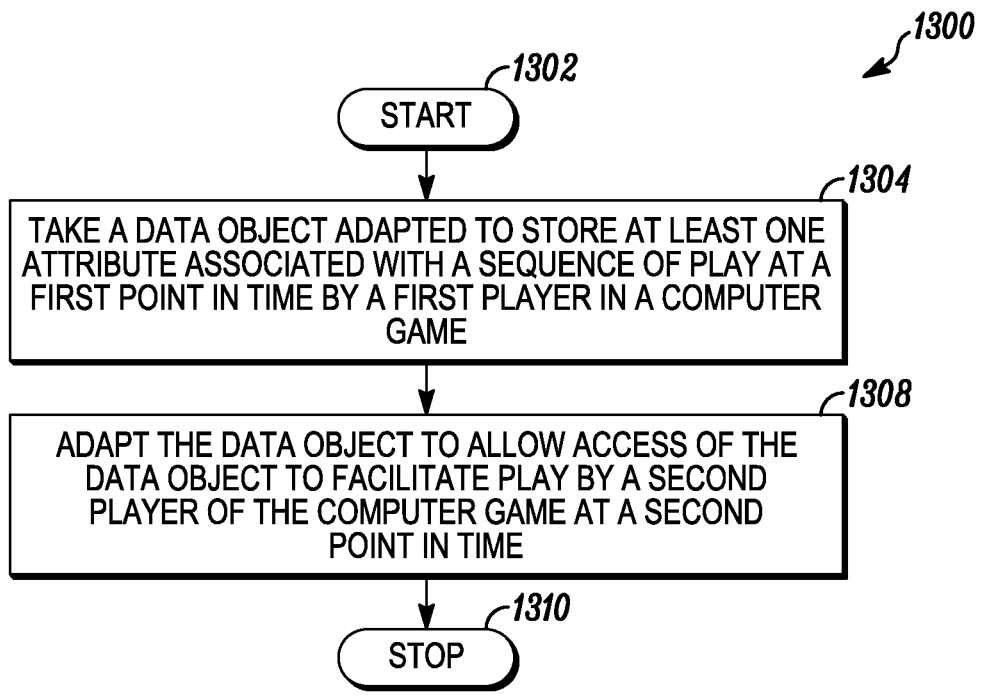
FIG. 20 depicts a flowchart of an event sequence object for enabling simulation of real time game in accordance with an embodiment of the present invention.

In one embodiment of the present invention event sequence objects may enable simulation of real time game play adapted to emulate real player style, ability, historical, and the like play. Referring to FIG. 20, methods and systems for event sequence object for real-time simulation of game and adapted to emulate real player may be provided. The process 1300 may start at step 1302 and may immediately move to step 1304. At step 1304, the process 1300 may determine a data object to store one or more attributes associated with the game play sequence at a particular point in time such as T1. For example, player X may play the game and the moves of the game play sequence may be stored in the memory or some other memory at time T1.

At step 1308, the stored game play sequence associated with the first player may be accessed and/or shared to facilitate a game play by a second player at time T2, where T1 happens before T2. Further, one or more attributes and/or events of the second game may be based on the first game. A real time simulation of a game based on the game play sequence of the first player may be provided to the second player at time T2 for asynchronous playing of the game.

At step 1310, the process 1300 may end.

In embodiments, the object storing the game play sequence may be adapted to facilitate repetition of historical sequences of play, simulate a level of ability of play, simulate a style of play, and the like.

Figure 21:
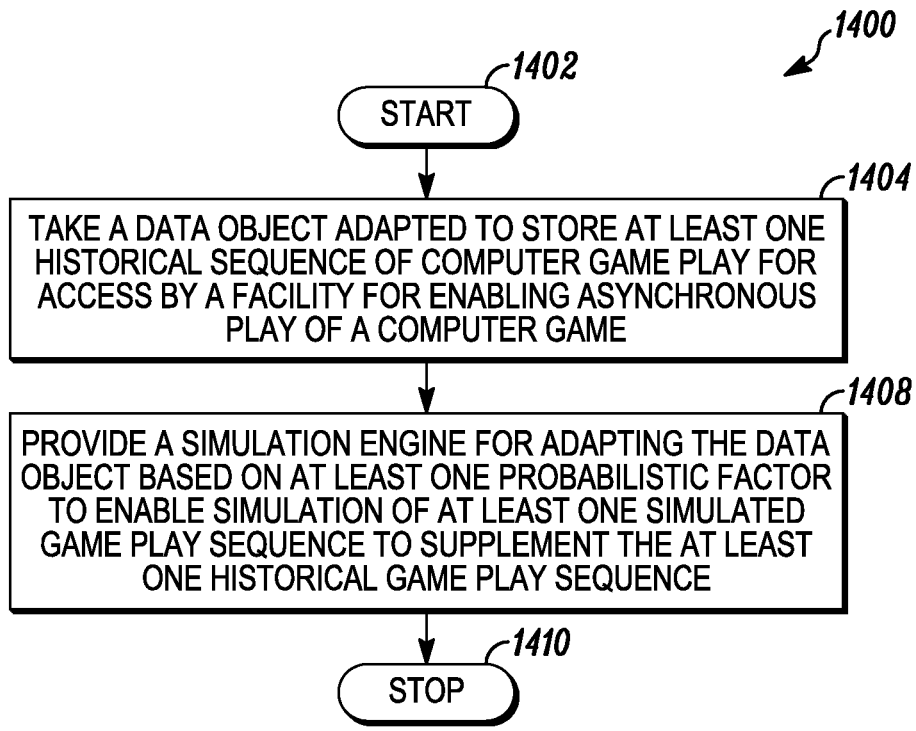
FIG. 21 depicts a flowchart in accordance with an embodiment of the present invention.

In one embodiment of the present invention, a probabilistic simulation engine may be used for enriching game play sequence objects. Referring to FIG. 21, methods and systems for probabilistic simulation engine for enriching the game play sequence object may be provided. The process 1400 may start at step 1402 and may immediately move to step 1404. At step 1404, the process 1400 may determine a data object created in the memory to store one or more historical sequences of computer games. The process 1400 may provide access to the stored sequence of game play to be utilized for playing an asynchronous game by a second player. For example, player X may play the game and the moves of the game play sequence may be stored in the memory based on one or more historical sequences of the computer game play.

At step 1408, a simulation engine may use the data objects and instantiate a computer game for a second player based on one or more probabilistic factors. A simulation may or may not allow addition of one or more historical game play sequences.

At step 1410, the process 1400 may end.

Figure 22:
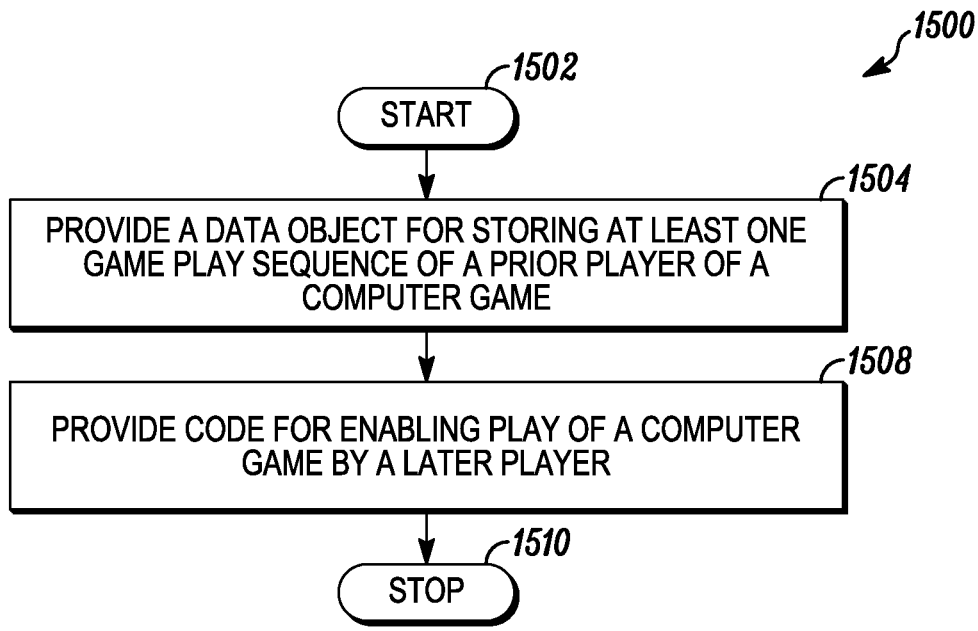
FIG. 22 depicts a flowchart of probabilistic simulation engine in accordance with an embodiment of the present invention.

In one embodiment of the present invention, asynchronous game play methods and systems with storage of game play sequence objects may be adapted for game type "x". Referring to FIG. 22, methods and systems for storage of a game play sequence object adapted to one or more type of games may be provided. The process 1500 may start at step 1502 and immediately move to step 1504. At step 1504, the process 1500 may store one or more game play sequences associated with one or more players at a particular point in time.

At step 1508, a second player may play the game. The process 1500 may provide a code and instantiate the game play sequence of the first player. A simulation of real-time play for the second player against the first player may be provided based on the game play sequence. The sequence may be associated with a particular type of computer game.

At step 1510, the process 1500 may end.

In embodiments the type of game may be a genre/event type. The genre/event type may include action, maze, platform/level horror, shooter, adventure, racing, strategy and the like. The type of game may be based on the context of the game. The context of the game may include fantasy/magic, horror, character/licensed, historical, science fiction/futurist and the like. The type of play may include collaborative, competitive, first person, massively multiplayer and the like. The type of game may be associated with a platform including a console (such as, for example, NINTENDO WII, PLAYSTATION 3, XBOX 360 or online connective channels thereof such as WIIWARE or XBOX LIVE ARCADE), web/online, mobile (including, for example, IPHONE, PDAs etc.), handheld proprietary systems (including, for example, NINTENDO DS/DSI and PSP), social network, cloud gaming and the like.

Figure 23:
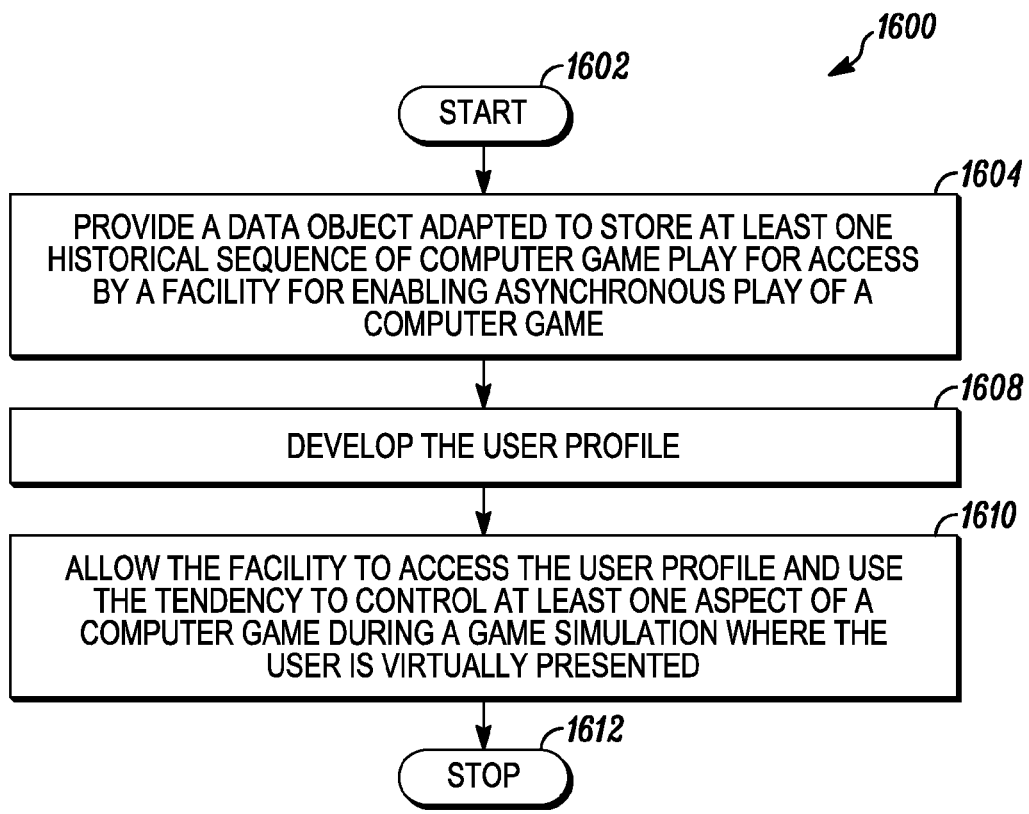
FIG. 23 depicts a flowchart of storage of game play sequence for asynchronous game play in accordance with an embodiment of the present invention.

In one embodiment of the present invention, a user profile including game play tendencies may be used for asynchronous game play. Referring to FIG. 23, methods and systems for game playing preferences associated with a user profile may be provided. The process 1600 may start at step 1602 and immediately move to step 1604. At step 1604, a data object may be created. The data object may store one or more historical sequences of the computer game. The process 1600 may access the game play sequence stored in the data object for facilitating the play of the asynchronous game.

At step 1608, a user profile may be created for a user. The user profile may be created based on one or more historical sequences of a computer game play. The user profile may allow the process 1600 to make predictions regarding the tendencies/moves/strategies, during the game.

At step 1610, the gaming facility may be accessed by the process 1600 to identify tendencies associated with the user's profile. These identified tendencies may be used for controlling aspects of the game, when the user is virtually present.

At step 1610, the process 1600 may end.

In embodiments, the user may be presented virtually to a live user. In another embodiment, the user may be presented virtually to a different user. The different user may a virtual user.

Having illustrated various aspects associated with how the present invention may enable a real-time like interactive asynchronous gaming experience with a number of process flow diagrams, we now turn to describing embodiments of the present invention related to video game systems and methods for providing interactive asynchronous multiple-player (hereinafter "multiplayer") game play. More specifically, the present invention may be related to puzzle video game systems and methods for providing live interactive asynchronous multiplayer game play between a live, current player (hereinafter "current player") and at least one previous player (hereinafter "previous player") via at least one recorded pre-played game (hereinafter "recorded game") of the previous player. The video game systems and methods may randomly select a recorded game of the previous player having a duration of time and/or a skill level that may correspond to a duration of time and/or skill level for a live game play of the current player.

For example, during live game play, the puzzle video game systems and/or methods may provide assortments of digital blocks (hereinafter "blocks") in a digital matrix (hereinafter "matrix") in which the current player and/or the previous player of the recorded game may manipulate, organize and/or drop blocks for forming and clearing complete digital horizontal lines (hereinafter "complete lines") from the matrix. Upon clearing one or more complete lines from the matrix, the current player or the previous player of the recorded game may transfer or send one or more complete digital garbage lines (hereinafter "garbage lines") to a bottom of the matrix of the other player. Clearing one or more complete lines located adjacent to the one or more garbage lines may remove the garbage lines from the matrix and/or may add one or more garbage lines to the matrix of the other player. The video game systems and/or methods may provide a digital sliding scale to indicate whether the current player or the previous player of the recorded game may have received or sent more garbage lines during the live game play.

The addition of the garbage lines to the bottom of the matrix may push or move one or more blocks within the matrix to a position above a skyline of the matrix. When one or more blocks are moved to a position above the skyline, a first game-ending condition, such as a knock-out, may occur. If complete lines are not formed and cleared from the matrix at a speed that is equal to or greater than a fall speed of newly generated blocks introduced into the matrix, one or more blocks locked-down within the matrix may extend above the skyline and a second game-ending condition, such as a lock-out or block-out, may occur. A digital incremental meter may record one or more occurrences of the game ending conditions to determine a winner and a loser of the live game play between the current player and the previous player of the recorded game.

During the recording of the recorded puzzle video game by the previous player, one or more garbage lines may be sent to and/or removed from the matrix of the previous player. Sending and/or removing garbage lines and/or occurrences of game-ending conditions may cause one or more delays in the live game play of the previous player by an amount of delay time. The video game systems and/or methods may provide a timer for terminating the game play of the previous player after expiration of a fixed or programmable total duration of time (hereinafter "total duration of time"). The video game systems and/or methods may stop or delay the timer to compensate for the amount of delay time so that the recorded game of the previous player expires at an adjusted duration of time that may be the same as or equal to a total fixed duration of time for the live game play of the current player. As a result, the game play of the current player and the recorded game of the previous player may expire after the same duration of time regardless of garbage lines and/or if game-ending conditions occur during the recording of the record game for the previous player.

Figure 24:
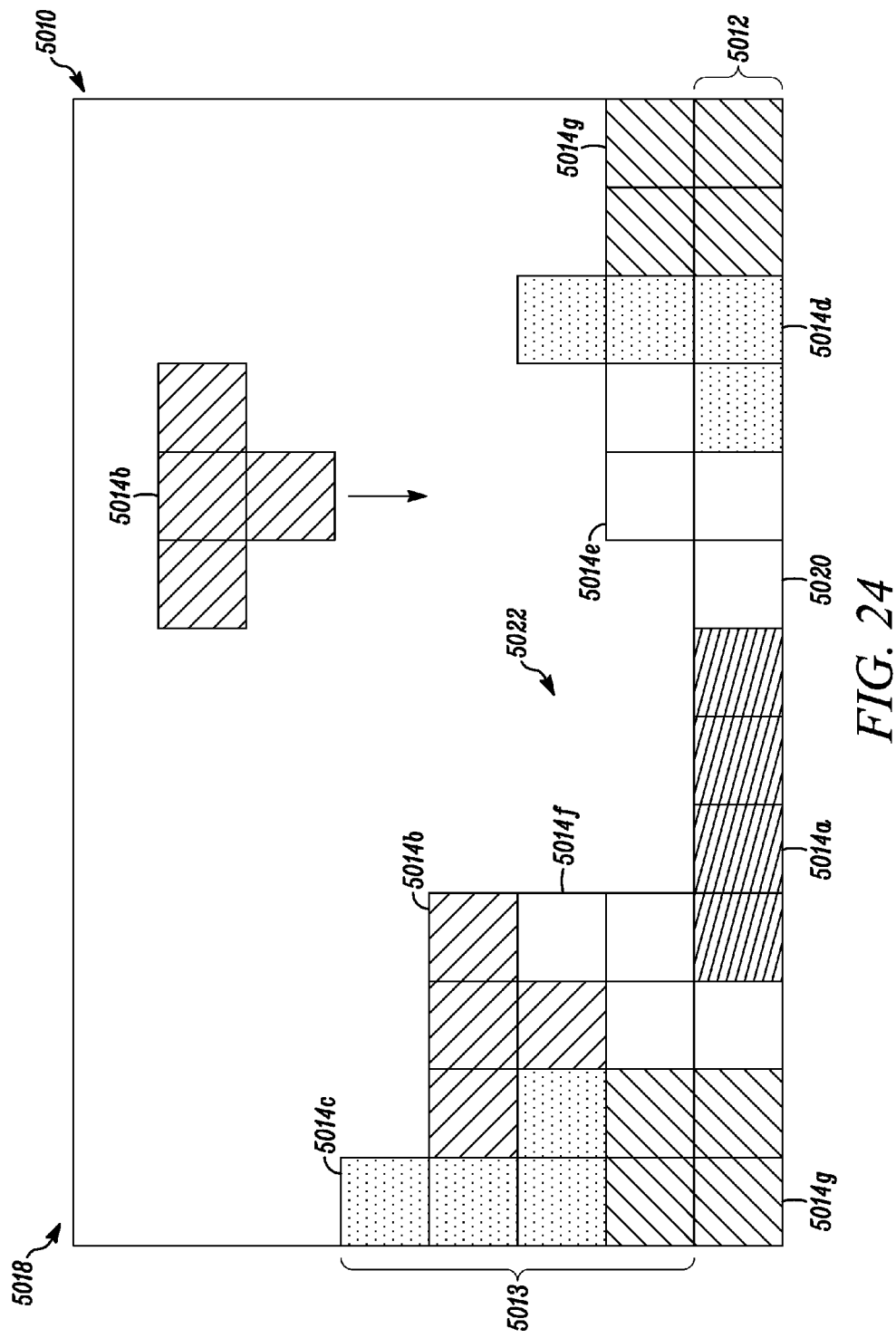
FIG. 24 depicts a puzzle game matrix diagram in an embodiment of the present invention.

In embodiments, a puzzle video game, such as, for example, TETRIS®, may be played on a gaming device by one or more players and/or opponents. As shown in FIG. 24, during game play of the video game, the current player may rotate, move and drop different falling digital tetrimino blocks 5014a-5014g (hereinafter "the blocks 5014a-5014g) within a digital matrix 5010 (hereinafter "the matrix 5010") to arrange and organize the blocks 5014a-5014g into one or more complete horizontal lines 5012 (hereinafter "complete lines 5012"), without any openings 5022 within the horizontal lines. A horizontal line having one or more openings 5022 may be identified as an incomplete horizontal line 5013 (hereinafter "incomplete line 5013"). The blocks 5014a-5014g are blocks composed of four connected squares or minos, in seven possible shapes. Once the current player has placed a tetrimino block in a final resting position, the tetrimino block is locked down and unable to be subsequently moved and/or rotated. Additionally, the current player may execute special actions, such as, block spins, block slots, block twists, floor kicks and/or wall kicks to position one or more tetrimino blocks into locations within the matrix 5010. Each complete line 5012 is eliminated or cleared from the matrix 5010. As a result, remaining blocks 5014a-5014g fall or move downward towards a bottom 5020 of the matrix 5010. The blocks 5014a-5014g, minos and/or matrix 5010 may be two-dimensional or three-dimensional.

The gaming device may include a digital display and input device. The gaming device may be, for example, a personal computer (hereinafter "PC"), a video gaming console, a handheld gaming device, an arcade gaming device, a hybrid gaming device, and the like. Alternatively, the gaming device may be a tablet PC, ultra-mobile PC, a mobile-based pocket PC, an electronic book computer, a laptop computer, a media player, a portable media device, a personal digital assistant, an enterprise digital assistant, a digital cable receiver, a graphic calculator, a Global Positioning System receiver, a digital audio player, a digital camera, a wrist watch, and the like. Moreover, the gaming device may be a mobile phone, a 4G mobile device, a 3G mobile device, an ALL-IP electronic device, an information appliance, a personal communicator, and the like.

The gaming device may provide the current player with the ability to play the video game in an online mode or a non-online mode. In the online mode, the gaming device may be connected to a fixed communication network or a wireless communication network so that the current player may access information associated with the video game and/or play against one or more remote opponents via the fixed or wireless communication network. In the non-online mode, the gaming device may not be connected to a wired or wireless communication network. As a result, the current player may not play against remote opponents, but the current player may play against local opponents and/or an artificial intelligence of the video game system.

The gaming device may have a wireless connection device, such as, for example, a Wi-Fi network device, a wireless ZIGBEE device, an ENOCEAN device, an ultra-wideband device, a wireless BLUETOOTH device, a wireless Local Area Network (hereinafter LAN) accessing device, a wireless IrDA device and/or the like. The wireless connection device may facilitate wireless game play against one or more opponents over a wireless communication network.

The fixed or wireless communication network may include a personal area network (PAN), a local area network (LAN), a campus area network (CAN), a Metropolitan area network (MAN), a wide area network (WAN), and the like. Alternatively, the fixed network may include an optical fiber network, an Ethernet, a cabled network, a permanent network, a power line communication network, an intranet, extranet, the Internet, and the like, which may include the world wide web. Moreover, the wireless network may include a wireless MAN, a wireless LAN, a wireless PAN, a Wi-Fi network, a WiMAX network, a global standard network, a personal communication system network, a pager-based service network, a general packet radio service, a universal mobile telephone service network, a satellite service network, a radio access network, and the like.

The gaming device may have an input device to allow the current player or the opponent(s) to control the movements, rotations and drops of the blocks 5014a-5014g within the matrix 5010. The input device may include a graphical user interface for the gaming device. Alternatively, the input device may include a touch screen, a stylus, a joystick, a keyboard, a cable remote, a mobile phone, or the like.

In this example, the general objective of the puzzle video game is to eliminate as many blocks 5014a-5014g and complete lines 5012 before (a) the blocks 5014a-5014g are pushed or moved above a buffer zone (not shown in the drawings) that is located directly above the matrix 5010, (b) the blocks 5014a-5014g are located in the buffer zone and prevent generation of a new block from the top of the buffer zone, or (c) expiration of a time limit. An opponent may send one or more incomplete lines 5013 to the matrix 5010 of the current player, which may be added at the bottom 5020 of the matrix 5010 of the current player. As a result, one or more blocks 5014a-5014g within the matrix 5010 or buffer zone may be pushed above the top of the matrix 5010.

Alternative objectives of the puzzle video game may include (a) eliminating a maximum number of complete lines 5012 before expiration of a predetermined time limit or before an opponent completes a predetermined number of complete lines 5012, (b) clearing all blocks 5014a-5014g from the matrix 5010, (c) clearing a bottom incomplete line 5013 from the matrix 5010, (d) clearing a pre-determined amount and/or assortment of blocks 5014a-5014g from the matrix 10, (e) clearing blocks 5014a-5014g and/or minos such that a digitally animated character or avatar may reach the bottom 5020 of the matrix 5010, (f) organizing blocks 5014a-5014g to form a design or object, such as, for example, a pyramid, and (g) clearing blocks 5014a-5014g from a spherical matrix (not shown in the drawings) to reveal a core in the center of the matrix. The opponent(s) may be, for example, one or more other players and/or an artificial intelligence associated with the puzzle video game.

The matrix 5010 is a digital grid having dimensions of, for example, ten (10) columns wide by twenty (20) rows high, eight (8) columns by twenty (20) rows, eight (8) columns by twelve (12) rows, five (5) columns by ten (10) rows or four (4) columns by ten (10) rows. The matrix 5010 has the horizontal skyline 5018 (hereinafter "skyline 18") located at the top of the matrix 5010 and a bottom 5020 located opposite to the skyline 18 of the matrix 5010. The buffer zone is separate from the matrix 5010 and is located directly above the skyline 5018. The buffer zone is positioned between the matrix 5010 and where block generation and game-ending conditions occur. The buffer zone has dimensions that are the same as or similar to the dimensions of the matrix 5010. The buffer zone and/or blocks 5014a-5014g located within the buffer zone may or may not be visible to the player.

Newly generated and introduced blocks 5014a-5014g fall from a top of the buffer zone at a point within the width of the matrix 5010. Upon introduction into the buffer zone and/or the matrix 10, the current falling tetrimino block is in a falling phase whereby the current player moves, rotates or drops the current falling tetrimino block within the matrix 5010. The newly introduced tetrimino blocks 5014a-5014g may fall or move downward from the buffer zone and/or the skyline 18 to the bottom 5020 of the matrix 5010 at a fall speed, such as less than three (3) seconds per line, less than two (2) seconds per line or less than one (1) second per line.

The blocks 5014a-5014g are one of seven different geometric shapes as shown in FIG. 24. Each tetrimino block is a geometrically shaped block, such as, for example, an I-shape block 5014a, a T-shape block 5014b, a L-shape block 5014c, a J-shape block 5014d, a S-shape block 5014e, a Z-shape block 5014f or a O-shape block 14g. Optionally, each tetrimino block may be specific color based on the geometric shape of the blocks 5014a-5014g. The tetrimino blocks 5014a-5014g having different geometric shapes may be colored differently and/or may have different graphical patterns displayed thereon.

One or more blocks 5014a-5014g may be positioned adjacent to each other to form a monster block (not shown in the figures) that is fused together and/or inseparable. For example, the blocks 5014a-5014g may have the same color and may be fused together after these tetrimino blocks 5014a-5014g are locked down adjacently to each other. Moreover, forming a complete line 5012, with the blocks 5014a-5014g having the same color, may destroy all of the blocks 5014a-5014g of that color within the matrix 5010.

With respect to the general objective of this example puzzle video game, the current player achieves a line clear by arranging, organizing and locking down the blocks 5014a-5014g into a complete line 5012 which extends across the width of the matrix 5010. The current player may allow the blocks 5014a-5014g to fall at the fall speed associated with a current difficulty level of the video game before locking the blocks down within the matrix 5010. Alternatively, the current player may perform a hard drop or a soft drop of one or more blocks 5014a-5014g in the matrix 5010. With hard drops, the blocks 5014a-5014g instantly drop straight down to the bottom 5020 of the matrix 5010 and lock down on the bottom 5020 of the matrix 5010 or on surfaces of one or more blocks 5014a-5014g located below and adjacent to the bottom 5020 of the matrix 5010.

In embodiments, with soft drops, the blocks 5014a-5014g drop up to about twenty (20) times faster than the fall speed associated with the current difficulty level and do not automatically lock down on the bottom 5020 and/or the surface of the blocks 5014a-5014g located below. The current player may be given a predetermined amount of time, such as about 0.5 seconds to move and/or rotate the blocks 5014a-5014g after executing soft drops before the blocks 5014a-5014g are locked down. The video game system and/or method may provide infinite spin which allows the current player to perform up to fifteen (15) rotations of a tetrimino block after the tetrimino block has fallen onto the surface of another tetrimino block or the bottom 5020 of the matrix 5010.

The player may achieve a higher level by clearing a specific number of complete lines 5012, such as, for example, about ten (10) or fifteen (15) line clears before one or more blocks extend into the skyline 5018 of the matrix 5010. The video game may award scoring and/or other bonuses for a number of complete lines 5012 cleared in one or more line clears, one or more special actions or back-to-back line clears. The video game may provide animation which complements scoring achieved by the current player.

After a line clear is achieved, incomplete lines 5013 and/or the blocks 5014a-5014g located above the complete line 5012 cleared from the matrix 5010 collapse downward towards the bottom 5020 of the matrix 5010. A gravity or cascade feature of the video game allows one or more minos of the blocks 5014a-5014g to separate and to fall downward as loose minos to fill in one or more openings 5022 below which may form one or more newly complete lines 5012. As a result, newly formed complete lines 5012 may additionally be cleared from the matrix 5010. Alternatively, one or more minos of a tetrimino block may not separate because the minos therein are sticky minos incapable of separating from each other.

As the difficulty level of game play increases, the fall speed in which the blocks 5014a-5014g may increase by predetermined velocities. As a result, the fall speed of the blocks 5014a-5014g at, for example, Level 4 may be twice as fast as the fall speed of the blocks 5014a-5014g at Level 1. Thus, the current player is afforded less time to arrange and organize the blocks 5014a-5014g at higher Level 4 because the fall speed is twice as fast as the fall speed of the blocks 5014a-5014g at lower Level 1.

If the current player fails to accomplish line clears at a speed substantially the same as or greater than the fall speed of newly introduced blocks 5014a-5014g, the game play of the current player may result in an occurrence of a game-ending condition. A game-ending condition, such as a block-out, may occur when existing blocks within the matrix 5010 and/or buffer zone prevents or prohibits a new tetrimino block from being generated and/or introduced into the matrix 5010 or the buffer zone. Another game ending condition includes a lock-out which occurs when a portion of a tetrimino block is locked down above the buffer zone. Yet another game ending condition includes the top-out which may occur when a part of a tetrimino block is pushed or forced upward by one or more incomplete lines 13 that may be added at the bottom 5020 of the matrix 5010 by an opponent.

In embodiments, the video game may include several play mode variations. For example, in marathon mode, a player is challenged by, for example, about fifteen (15) increasingly difficult levels of game play. In challenge or ultra mode, a player is challenged to score as many points or to clear as many complete lines 5012 in a specific duration of time, such as, for example, ten (10) minutes, three (3) minutes or two (2) minutes. In sprint mode, a player is challenged to clear a specific number of lines, such as, for example, forty (40) lines in a shortest duration of time possible by the player. In cooperative mode, two or more players work together to achieve line clears within the same matrix 5010. In target mode, a player must clear a predetermined number of target blocks or minos from a matrix 5010 within a predetermined amount of time. In mission mode, a player must complete a mission, such as clearing two lines with, for example, a J-shaped block to achieve a higher level.

As shown in FIGS. 25-28, the video game may include one or more next queue boxes 5050a-5050e (hereinafter "the queue boxes 5050a-5050e") displayable to a player and/or an opponent. The one or more boxes queue 5050a-5050e display one or more next, upcoming blocks 5052a-5052e (hereinafter "upcoming blocks 5052a-5052e") that is generated and introduced into the matrix 5010 via the buffer zone. The queue boxes 5050a-5050e may display any number of upcoming blocks to be generated and introduced into the matrix 10 via the buffer zone. The queue boxes 5050a-5050e may be shared by a player and one or more opponents so that the next upcoming block 5052a displayed in the uppermost queue box 5050 may be introduced into the matrix 5010 of which every player or opponent is first to lock down the current block falling within their matrix.

The puzzle video game may include a hold box 5054 which allows a player to hold and save a newly generated block (not shown in the drawings) from being introduced into the matrix 10 via the buffer zone. The player may swap the saved block held within the hold box 54 with a newly generated block to introduce the saved block that was held within the hold box 5054 into the matrix 5010 via the buffer zone. Alternatively, the player may, at any time, release the saved block that was held within the hold box 5054 into the matrix 5010 via the buffer zone.

The puzzle video game may include a ghost piece 5058 located within the matrix 5010, which is a copy of the current falling tetrimino block within the matrix 5010 or buffer zone. The ghost piece 5058 indicates to the player where the current falling tetrimino block will come to rest in the matrix 5010 if it were dropped from its current position. The ghost piece 5058 appears in the matrix 5010 as a block outline or as a translucent "ghost" image of the currently falling tetrimino block. The ghost piece 5058 has the same geometric shape as the current falling tetrimino block within the matrix 5010 or buffer zone.

Prior to beginning game play of the video game, a player selects, for example, a number of players, a starting difficulty level and/or a mode of game play. The video game may include more than one difficulty level. For example, the video game may include difficulty levels ranging from 1 to 15, whereby difficulty level 1 is the least difficult and difficulty level 15 is the most difficult. Any number of players and/or opponents may be capable of playing the video game simultaneously, individually, in competition or in cooperation. The queue boxes 5050a-5050e, the hold box 5054 and ghost piece 5058 features are selectable or deselectable by the player and/or opponents at any time.

During game play, the video game may display information regarding a current game being played by the current player via the digital display 5060 of the gaming device. The information may include the game mode, a number of line clears achieved 5062, a number of lines remaining to be cleared, a current difficulty level 5064, a time elapsed, a time remaining, a current score, a high score, a player name 5068, a player rank 5070, and the like.

As illustrated in FIG. 24, the player may move a current falling tetrimino block, within the matrix 10 or buffer zone, left, right and downward and/or rotates the current block clockwise or counterclockwise to position the current falling tetrimino block in the matrix 5010. Each rotation of the block occurs at 90° intervals. The current falling block rotates via a digital rotation system that prioritizes possible rotations using five (5) rotation points of the block. If walls of the matrix 5010 and/or locked down blocks in the matrix 5010 prevent all five (5) rotations of the current falling tetrimino block, then the current falling tetrimino block is unable to be rotated.

The current falling tetrimino block may be locked down into an unchangeable position after the current falling tetrimino block comes to rest on a surface of another tetrimino block or the bottom 5020 of the matrix 5010. The player may be allowed to rotate and/or move the current tetrimino block for a predetermined amount of moves, such as, for example, about fifteen (15) rotations, or for a predetermined amount of time, such as, for example, about 0.5 seconds after which the block is locked down.

After the current tetrimino block is locked down, the video game may determine whether one or more complete lines 12 are present in the matrix 5010. If so, the video game system clears the one or more complete lines 12 from the matrix, shifts remaining blocks 5014a-5014g and incomplete lines 5013 downward, adjusts any separated minos from the cascade feature, reexamines the matrix 5010 for additional newly complete lines 5012 and clears any additional newly complete lines 5012 from the matrix 5010. If a complete line 5012 is not formed by locking down the current tetrimino block, then the video game generates and introduces a new block into the matrix 5010 via the buffer zone.

In embodiments, the video game may terminate game play for the player when the game play results in an occurrence of a game-ending condition. The game-ending condition may occur when (a) blocks are pushed or forced above the buffer zone of the digital matrix 5010 by incomplete lines 5013 being add at the bottom 5020 of the matrix 5010 (a top-out), (b) an entire block or a part of a block being locked down above the skyline 5018 or buffer zone (a lock-out), (c) a new block is prevented from being generated by an existing block that is locked down in a position where port of the new block would be generated (a block-out), and the like. Upon termination of the game play for the current player, the video game may display the information related to the terminated game to the player.

In embodiments, a current player of a video game may compete against an opponent or an artificial intelligence of a video game system in live game play. During the live game play, the current player, the opponent and/or the artificial intelligence may arrange, organize and lock down one or more blocks 5014a-5014g in real time to form one or more complete lines 5012 for clearing the complete lines 5012 and/or the blocks 5014a-5014g from the matrix 5010. The current player, the opponent and/or the artificial intelligence may make real-time or live decisions for moving the currently falling blocks 5014a-5014g to form the complete lines 5012. Often, a live opponent may not be available to compete against the current player in live game play. As a result, the current player may have to compete against the artificial intelligence, which may be inferior to the current player, to participate in live game play. However, the current player may desire to conduct game play against an opponent instead of conducting game play against the inferior artificial intelligence of the video game system. As a result, the current player may be discouraged from game play of the video game system because game play against a live opponent, instead of the artificial intelligence, may not be available.

In embodiments, the present invention may provide asynchronous multiplayer game play which may allow a current player to conduct live game play against a recorded game of a previous player. Further, the present invention may provide an asynchronous multiplayer game play which may challenge a current player with live game play against a randomly selected recorded game of a previous player, provide an asynchronous multiplayer game play which may provide a current player with game play against a recorded game at the same or substantially similar skill level and for a fixed duration of time, provide an asynchronous multiplayer game play which may add or remove one or more complete garbage lines within a digital matrix based on game play of a current player or a previous player of a recorded game, provide an asynchronous multiple-player game play which may stop or delay a timer for game play during recording of the game play to produce a recorded game that may expire after a fixed duration of time, and the like.

In embodiments, the present invention may provide live asynchronous multiple-player game play. In embodiments, the present invention may provide live asynchronous multiple-player game play between a current player and a previous player of a recorded game. The game play of the current player may be at a skill level and may terminate after a total duration of time may have elapsed. The current player may compete against the recorded game play from a recorded game of the previous player that may correspond to the skill level and total duration of time associated with the live game play of the current player.

Continuing with the puzzle video game example, the current player or the previous player of the recorded game may manipulate, organize and/or drop the blocks to faun and clear complete lines from the matrix and/or to reach the bottom of the matrix. Upon clearing complete lines and/or reaching the bottom of the matrix, the current player or the previous player of the recorded game may send or add one or more garbage lines to the bottom of the matrix of the other player. As the garbage lines are added to the bottom of the matrix, the blocks currently within the matrix may be moved or pushed upwardly towards the skyline of the matrix. A knockout, a first game-ending condition, may occur if the garbage lines push the blocks within the matrix above the skyline of the matrix. A second game-ending condition may occur if newly generated blocks are added to the matrix and are locked down above the skyline or are blocked from entry into the matrix by existing blocks within the matrix. The garbage lines may be removed from a matrix if one or more complete lines are cleared from the matrix or if one or more complete lines located adjacent to the garbage lines are cleared from the matrix by the live game play of the current player or the recorded game play previous player.

The video game system and/or methods may record live game play of a previous player to produce or create a recorded game for use during live asynchronous game play with a current player. During the recording of the live game play of the previous player, adding or removing one or more garbage lines may occur and/or one or more game-ending conditions may occur. Adding and/or removing garbage lines and/or occurrences of game-ending conditions may delay the live game play of the previous player by an amount of delay time. As a result, the live game play of the previous player, which is being recorded, may be increased by the amount of delay time. The video game systems and/or methods may provide a timer for terminating the game play after expiration of a total duration of time. The video game systems and/or methods may compensate for the amount of delay time by stopping or delaying the timer for the live game play of the previous player so that the recorded game of the previous player expires at an adjusted duration of time. The adjusted duration of time of the recorded game of the previous player may be the same as or equal to the total duration of time for the live asynchronous game play of the current player.

An advantage of the present invention may be to provide video game systems and methods for providing asynchronous multiplayer game play which may challenge a current player to live game play against a recorded game of a previous player.

Another advantage of the present invention may be to provide video game systems and methods for providing asynchronous multiplayer game play which may allow a current player to conduct live game play against a recorded game randomly selected for more than one recorded game of one or more previous players.

Another advantage of the present invention may be to provide video game systems and methods for providing asynchronous multiplayer game play which may prevent a current player from having to conduct live game play against artificial intelligence of a video game system.

A further advantage of the present invention may be to provide video game systems and methods for providing asynchronous multiplayer game play which may challenge a current player to live game play against a recorded game at the same skill level and/or for the same duration of time.

Moreover, an advantage of the present invention may be to provide video game systems and methods for providing asynchronous multiplayer game play which may add or transfer one or more complete horizontal digital garbage lines to a bottom of a digital matrix based on the live game play of a current player or record game play of a previous player.

Another advantage of the present invention may be to provide video game systems and methods for providing asynchronous multiplayer game play which may remove one or more complete horizontal digital garbage lines from a bottom of a digital matrix by clearing one or more complete lines or at least one complete line adjacent to the garbage lines from the matrix.

Yet another advantage of the present invention may be to provide video game systems and methods for providing asynchronous multiplayer game play which may provide a digital sliding meter to indicate whether a current player or a previous player has received more digital garbage lines during live game play.

Another advantage of the present invention may be to provide video game systems and methods for providing asynchronous multiplayer game play which may commit a knockout game-ending condition by adding digital garbage lines to push digital blocks within a digital matrix above a skyline of the digital matrix.

A still further advantage of the present invention may be to provide video game systems and methods for providing asynchronous multiplayer game play which may adjust a timer associated with live game play by the previous player such that the recorded game play terminates at a fixed and/or programmable total duration of time.

Yet another advantage of the present invention may be to provide video game systems and methods for providing asynchronous multiplayer game play which may stop or delay a timer for live game play of a previous player to compensate for an amount of delay time associated with adding or removing one or more digital garbage lines or one or more occurrences of a game-ending condition.

The present invention may provide live asynchronous multiple-player game play which may allow a current player to conduct live game play against a recorded game of the previous player. The video game systems and methods may randomly select a recorded game of a previous player from a collection of recorded games of one or more previous players. The randomly selected recorded game may be at a skill level that is the same as or substantially similar to a skill level of the current player. Moreover, the randomly selected recorded game may terminate at an adjusted duration of time that is the same as or equal to a total duration of time for the live asynchronous game play of the current player.

In embodiments, the game play by the previous player may cause one or more delays in the live game play that may affect a total duration of time for the recorded game. The one or more delays caused by the game play of the previous player may increase the total duration of time for the recorded game by an amount of delay time. A timer associated with the game play of the previous player may be delayed or stopped during the recording of the live game play of the previous player to compensate for the one or more delays and/or the amount of delay time. After compensating the timer for the one or more delays and/or amount of delay time, an adjusted duration of time of the recorded game may be the same as or equal to the total duration of time for the live asynchronous game play of the current player. One or more meters may be provided to indicate a winner of the live game play between the current player and the previous player of the recorded game.

A video game system may collect and/or store one or more recorded games of one or more previous players to be utilized during live asynchronous game play by the current player. The video game system may create or produce a recorded game of a previous player by recording and/or storing live game play by the previous player competing against an opponent. The opponent competing against the previous player may be a live player, artificial intelligence of the video game system or a recorded game of another previous player. In the later case, the present previous player may be identified or known as the current player.

Continuing with the puzzle video game example, during the live game play between previous player and the opponent, the falling blocks 5014a-5014g may be manipulated, organized and/or arranged within the matrix 5010 of the previous player and the opponent as shown in FIG. 24 via an input device of the video game system. The previous player or opponent may manipulate, organize and/or drop the falling blocks 5014a-5014g to form complete lines 5012 that are cleared from the matrix 5010.

The live game play between the previous player and the opponent may terminate after expiration of the total duration of time associated with the live game play of the previous player. For example, the total duration of time for the live game play may be greater than ten (10) minutes, ten (10) minutes, five (5) minutes, two (2) minutes or less than two (2) minutes. A winner of the live game play between the previous player and the opponent may be determined by a number of lines clears achieved 5062 by the previous player and the opponent at the expiration of the total duration of time as shown in FIGS. 25-28. The total duration of time for the live asynchronous game play of the current player may be equal to or the same as the total duration of time for the live game play of the previous player. The present invention should not be deemed as limited to a specific embodiment of the duration of time for the game play between the previous player and the opponent.

Figure 26:
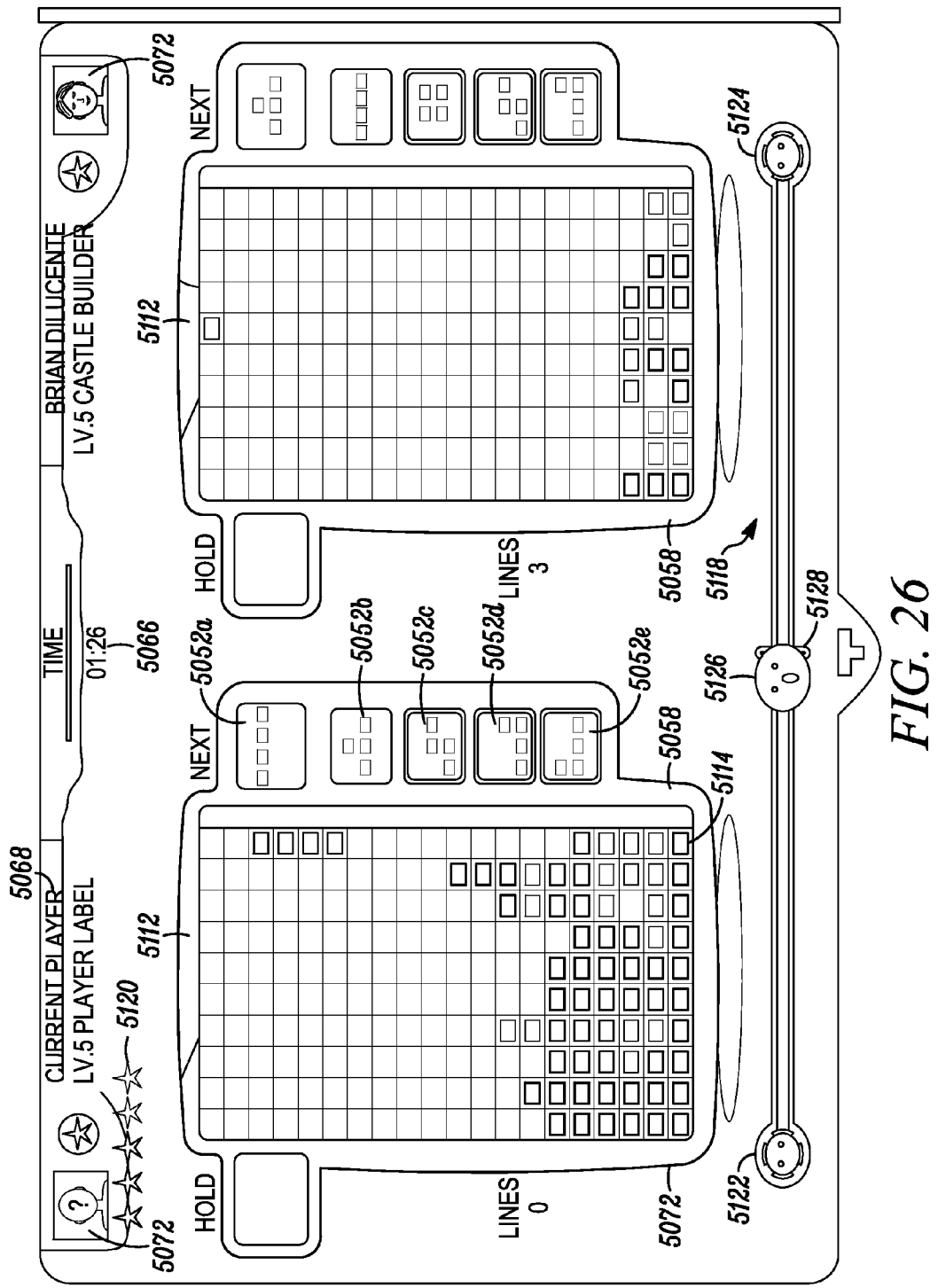
FIG. 26 depicts a video game system having a digital display in an embodiment of the present invention.
Figure 27:
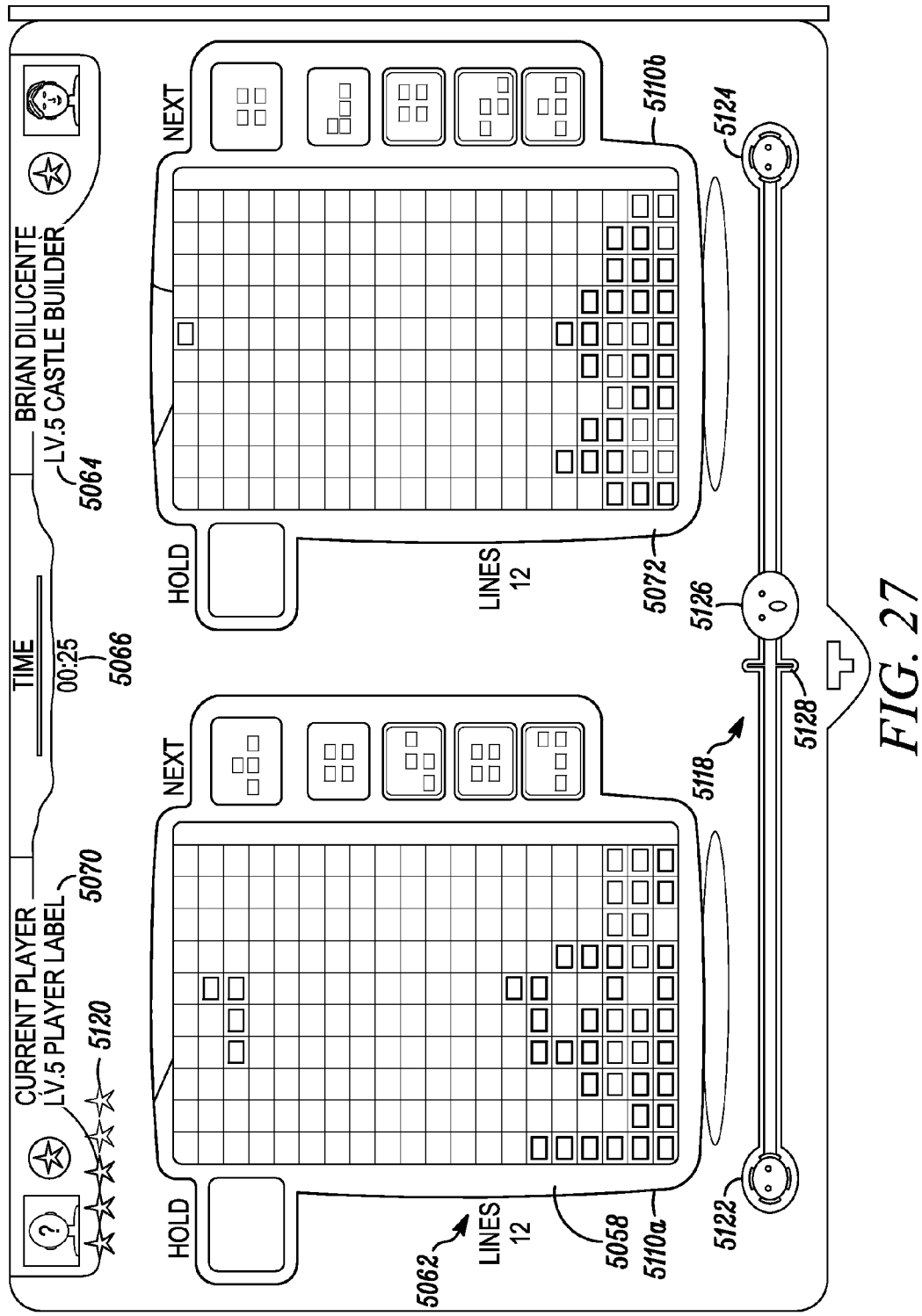
FIG. 27 depicts a video game system having a digital display in an embodiment of the present invention.

During the live game play by the previous player, the previous player or the opponent may simultaneously clear one or more complete lines 5012 from the matrix 5010 and/or may reach a bottom 5020 of the matrix 5010 by clearing one or more complete lines 5012 adjacent to the bottom 5020 of the matrix. As a result, one or more garbage lines 5072 may be added at the bottom 5020 of the matrix 5010 of the other player as shown in FIGS. 26 and 27. The one or more garbage line 5072 may be a complete horizontal line extending across the width of the matrix 5010. The one or more garbage line 5072 may not have any openings 5022 across the width of the matrix 5010. Without any openings 5022 across the width of the matrix 5010, currently falling blocks 5014a-5014g may not be arranged to complete or clear the one or more garbage lines 5072 from the matrix 5010. In other words, the one or more garbage lines 5072 cannot be removed from the matrix 5010 by adding one or more minos of currently falling blocks 5014a-5014g to the one or more garbage lines 5072 because the one or more garbage line 5072 do not have any openings 5022.

A garbage line 5072 may be formed by a single horizontal line of minos extending across the width of the matrix 5010. The minos of the garbage line 5072 may be colored differently and/or may have different graphical patterns displayed thereon as compared to the colors and/or graphical patterns displayed on the blocks 5014a-5014g. For example, the minos of the garbage line 5072 may be colored gray and/or may have no graphical patterns displayed thereon. In embodiments, the entire garbage line 5072 may be a continuous line extending across the width of the matrix whereby no individual minos are identified and/or displayed.

The blocks 5014a-5014g currently within the matrix 5010 may be moved or pushed upwardly towards the skyline 18 of the matrix 5010 by the one or more garbage lines 5072 added at the bottom 5020 of the matrix 5010. The garbage lines 5072 may push the blocks 5014a-5014g currently within the matrix 5010 to a position above the skyline 5018 of the matrix 5010. A first game-ending condition, known as a knock-out, may occur if one or more minos of one or more blocks 5014a-5014g within the matrix 5010 may be pushed above the skyline 5018 of the matrix 5010 by the addition of the one or more garbage lines 5072. As a result, the first game-ending condition may be committed by the addition of the one or more garbage lines 5072 to the matrix 5010. After the first game-ending condition may occur, a point may be added to the one or more meters displayed by the video game system to indicate that the first game-ending condition may have occurred. Subsequently, the one or more garbage lines 5072 may be removed from the matrix 5010 by the video game system and the game play of the previous player or the opponent may continue.

For example, the opponent may simultaneously clear two complete lines 5012 from the matrix 5010 as shown in FIG. 24. Alternatively, the opponent may clear one complete line 5012 adjacent to the bottom 5020 of the matrix 5010 to reach the bottom 5020 of the matrix 5010 of the opponent. As a result, the opponent may send a garbage line 5072 to the matrix of the previous player, and the matrix 5010 of the previous player may receive a garbage line 5072 at the bottom 5020 of the matrix 5010. The garbage line 5072 added at the bottom 5020 of the matrix 5010 of the previous player may push the blocks 5014a-5014g currently within the matrix 5010 towards the skyline 5018 of the matrix of the previous player. The one or more blocks 5014a-5014g within the matrix 5010 may be pushed above the skyline 5018 of the matrix 5010 by the garbage line 5072. As a result, the first game-ending condition may occur from the addition of the garbage line 5072 and a point may be added to the one or more meters for the opponent. Optionally, the video game system may clear the one or more garbage lines 5072 from the matrix 5010 of the previous player and the live game play of the previous player may continue.

Alternatively, one or more garbage lines 5072 may push the blocks 5014a-5014g towards the skyline 5018 of the matrix without an occurrence of the first game-ending condition. As a result, the live game play between the previous player and the opponent may continue and newly generated blocks 5014a-5014g may continue to be introduced into, the matrix 5010 from the skyline 5018 of the matrix 5010. If new complete lines 5012 are not be formed with the newly generated blocks 5014a-5014g and the blocks 5014a-5014g currently within the matrix and/or cleared from the matrix 5010, the blocks 5014a-5014g within the matrix 5010 may approach and may extend above the skyline 5018 of the matrix 5010. As a result, a second game-ending condition, such as a lock-out or a block out, may occur during the live game play between the previous player and the opponent. After the second game-ending condition may occur, a point may be added to the one or more meters displayed by the video game system to indicate that the second game-ending condition may have occurred. Subsequently, the one or more garbage lines 5072 may be removed from the matrix 5010 by the video game system and the game play of the previous player or the opponent may continue.

In embodiments, simultaneously clearing two or more complete lines 5012 from the matrix 5010 or simultaneously clearing one or more complete lines 5012 adjacent to one or more garbage lines 5072 within the matrix 5010 may remove one or more garbage lines 5072 from the matrix 5010 and/or may add one or more garbage lines 5072 to the matrix of the other player. As a result, the previous player and the opponent may send, receive and/or remove one or more garbage lines 5072 during the game play.

For example, the previous player may simultaneously clear three complete lines 5012 from the matrix 5010. As a result, a single garbage line 5072 located at the bottom 5020 of the matrix 5010 of previous player may be removed from the matrix 5010. In another example, the previous player may simultaneously clear two complete lines 5012 adjacent to two garbage lines 5072 within the matrix 5010 of the previous player. As a result, the two garbage lines 5072 may be removed from the matrix 5010. In yet another example, the previous player may simultaneously clear three complete lines 5012 adjacent to two garbage lines 5072 located at the bottom 5020 of the matrix 5010 of the current player. As a result, the two garbage lines 5072 may be removed from the matrix 5010 of the current player and one or more garbage lines 5072 may be added at the bottom 5020 of the matrix 5010 of the opponent.

In embodiments, poor game play by the previous player and/or the opponent may result in the second game-ending condition occurring while one or more garbage lines 5072 are present at the bottom 5020 of the matrix 5010. As a result, the video game system may clear the one or more garbage lines 5072 from the matrix 5010 and live game play between the previous player and the opponent may continue.

The poor game play by the previous player and/or opponent may result in the second game-ending condition occurring without garbage lines 5072 within the matrix 5010. As a result, the video game system may clear one or more incomplete lines 5013 from the matrix 5010 and the live game play by the previous player and/or the opponent may continue. Alternatively, the live game play by the previous player and/or the opponent may be immediately terminated when the second game-ending condition occurs without garbage lines 5072 within the matrix 5010. As a result, the live game play by the previous player and/or the opponent may not be saved by the video game system, and any recorded game play by the previous player and/or the opponent may be disregarded by the video game system.

Figure 25:
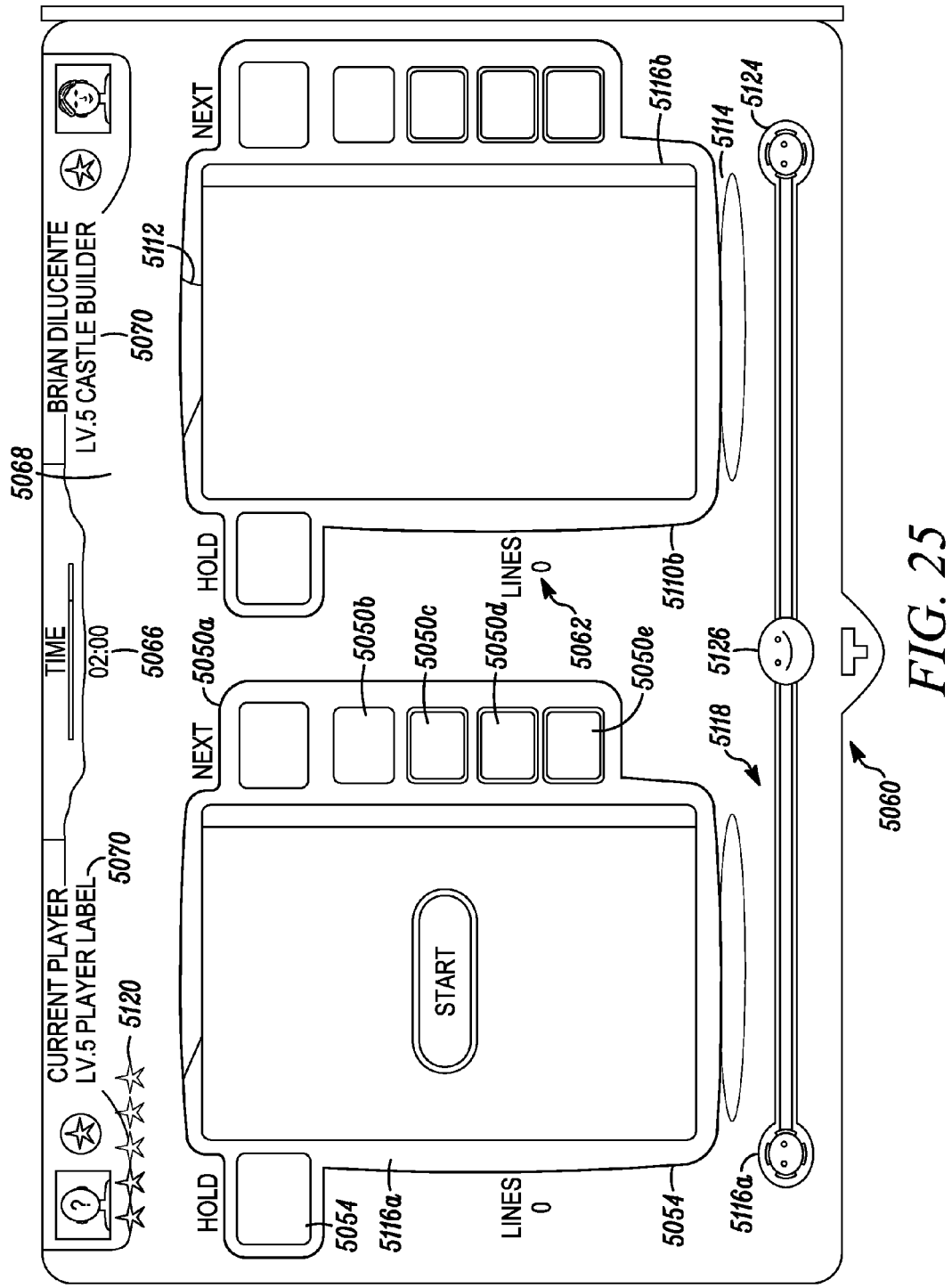
FIG. 25 depicts a video game system having a digital display in an embodiment of the present invention.

The video game system may provide at least one timer 5066 associated with the live game play of the previous player and/or the opponent as shown in FIGS. 25-28. The timer 5066 may display the amount of time elapsed during the live game play or the amount of the remaining in the live game play. The timer 5066 may display the total duration of time for the live game play between the previous player and the opponent. For example, the timer 5066 may display the total duration of time for the live game play, such as two (2) minutes as shown in FIG. 25.

Each occurrence of adding or removing one or more garbage lines 5072 with respect to the matrix 5010 may delay the live game play of the previous player and/or the opponent by an amount of delay time. Further, clearing or removing one or more garbage lines 5072 and/or incomplete lines 5013 after each occurrence of the first or second game-ending conditions may delay the live game play by the amount of delay time. The amount of delay time may be dependent upon the number of garbage lines 5072 added or removed from the matrix 5010 or the number of incomplete lines 5013 cleared from the matrix 5010. The amount of delay time may be, for example, less than one (1) second, one second or greater than one (1).

The amount of delay time may increase an actual duration of time for the live game play of the previous player and the opponent to an adjusted duration of time. As a result, the adjusted duration of time may be greater than the total duration of time for the live game play. However, if the live game play between the previous player and opponent is recorded and/or saved to create a recorded game for live asynchronous game play with a current player, one or more garbage lines 5072 utilized during the live game player of the previous player may not be included or may be deleted from the recorded game of the previous player and/or opponent. Live asynchronous game play between the current player and the recorded game of the previous player may require the adjusted duration of time for the recorded game of the previous player to be the same as or equal to the total duration of time for the asynchronous game play for the current player. Otherwise, the recorded game of the previous player may end or terminate after the expiration of the total duration of time for the live asynchronous game play of the current player.

To create a recorded game that does not include the amount of delay times or have an adjusted duration of time greater than the total duration of time for the live asynchronous game play, the timer 5066 for the live game play of the previous player may be stopped or delayed. Further, the timer 5066 may be stopped or delayed for an amount of time to compensate for the amount of delay time associated with the delays during the game play of the previous player. The timer 5066 may be stopped or delayed for an amount of time that may be equal to or the same as the amount of delay time for the delays that occur during the live game play of the previous player. As a result, the adjusted duration of time for the live game play of the previous player may be equal to or the same as the total duration for the live game play of the previous player. Moreover, the adjusted duration of time for the recorded game of the previous player may be equal to or the same as the total duration of time for the live asynchronous game play of the current player.

FIGS. 25-28 illustrate a digital display 5060 for a game device (not shown in the drawings) of a video game system in accordance with the present invention. The digital display 5060 renders or displays a first matrix 5110a for the current player and a second matrix 5110b for the recorded game of the previous player. Each first matrix 5110a and the second matrix 5110b (hereinafter "the matrixes 5110a, 5110b") have a skyline 5112 and a bottom 5114 which may be located opposite to the skyline 5112. Further, the matrixes 5110a, 5110b may include the queue boxes 5050a-5050e and/or the hold box 5054. Moreover, the digital display 5060 may render and/or display the at least one timer 5066 at a location between the matrixes 5110a, 5110b.

The digital display 5060 may be divided into a first right half 5116a (hereinafter "the first half 5116a") and a second left half 5116b (hereinafter "the second half 5116b"). The first half 5116a may include the first matrix 5110a of the current player and information associated with the first matrix 5110a and/or the current player. The second half 5116b may include the second matrix 5110b of the previous player and information associated with the second matrix 5110b and/or the previous player. The information associated with the matrixes 5110a, 5110b, the current player and/or the previous player may include the number of line clears achieved 5062, the current difficulty level 5064, the player name 5068 and/or the player rank 5070 and/or a digital image or avatar 5072. Moreover, the digital display 5060 may render or display a first digital meter 5118 (hereinafter "the first meter 5118") and a second digital meter 5120 (hereinafter "the second meter 5120") which may be indicative of the asynchronous game play between the current player and one or more recorded games of one or more previous players.

FIG. 25 illustrates the first matrix 5110a of the current player and the second matrix 5110b of the previous player at the beginning of live asynchronous game play between the current player and the previous player. The matrixes 5110a, 5110b, the hold box 5052 and/or the queue boxes 5050a-5050e may be empty at the beginning of the live asynchronous game play. The complete line clears achieved 5062 for the current and previous players may indicate "zero" at the beginning of the live asynchronous game play. Moreover, the timer 5066 may indicate the total duration of time for the live asynchronous game play between the current and previous players. For example, the timer 5066 may indicate that the total duration of time for the live asynchronous game play may be two (2) minutes.

To begin the live asynchronous game play, the video game system may randomly select, retrieve and open a recorded game of a previous player from a database (not shown in the drawings). The video game system may randomly select the recorded game from based on the skill level of the previous player of the recorded game and/or based on the total duration of time of the recorded game. The previous player of the selected recorded game may be playing at a skill level that is the same as or equal to the skill level of the current player. Moreover, the total duration of time of the selected recorded game may be the same as or equal to the total duration of time of the live asynchronous game play of the current player.

Once the live asynchronous game play is initiated, the queue boxes 5050a-5050e may be filed with blocks 5014a-5014g which may subsequently be introduced into the matrixes 5110a, 5110b as shown in FIG. 26. Newly generated blocks 5014a-5014g may be introduced into the matrix 5110a and the current player may manipulate, organize and/or arrange the blocks 5014a-5014g within the matrix via the input device of the video game system. Simultaneously, the video game system plays or performs the recorded game of the previous player in real time against the live game play of the current player. Ghost pieces 5058 may have been selected by the current player and may be displayed in the matrixes 5110a, 5110b.

The current player and the previous player of the recorded game may form and clear complete lines 5012 with the blocks 5014a-5014g within the matrixes 5110a, 5110b. The current and previous players may send, receive and/or remove one or more garbage lines 5072. For example, the previous player of recorded game may have cleared three (3) complete lines 5012 and sent a garbage line 5072 to the first matrix 5110a of the current player as shown in FIG. 26. In another example, the current player may have clear twelve (12) complete lines 5012, removed any garbage lines from the first matrix 5110a and/or may have sent at least two (2) garbage lines to the second matrix 5110b of the previous player as shown in FIG. 27.

The first meter 5118 may be a horizontal sliding meter having first end 5122 adjacent to the first matrix 5110a of the current player and a second end 5124 adjacent to the second matrix 5110b of the previous player as illustrated in FIGS. 25-28. The first meter 5118 may have a marker 5126 which may be located at a neutral position 5128 at the beginning of the asynchronous game play between the first matrix 5110a of the current player and the second matrix 5110b of the recorded game of the previous player as shown in FIG. 25. The neutral position 5128 may be positioned equally between the first end 5122 and the second end 5124. During live asynchronous game play between the current player and previous player, one or more garbage lines 5072 may be received by the matrixes 5110a, 5110b of the current player and the previous player, respectively. For each garbage line 5072 received by one of the matrixes 5110a, 5110b, the marker 5126 may move or slide an increment towards the first end 5122 or the second end 5124 adjacent to the matrix receiving the garbage line 5072.

The first meter 5118 may have a number of increments between the neutral position and the first end 5122 or the second end 5124. The number of increments may be, for example, five (5) or less increments, ten (10) increments, fifteen increments (15) or greater then fifteen (15) increments. However, the number of increments of the first meter cannot be greater than a number of rows within the matrixes 5110a, 5110b. The present invention should not be deemed as limited to a specific embodiment of the number of increments for the first meter 5118.

For example, one garbage lines 5072 may be present within the first matrix 5110a of the current player. As a result, the marker 5126 of the first meter 5118 may be located one increment closer to the first end 5122 of the first meter 5118 as shown in FIG. 26. In another example, two garbage lines 5072 may be present within the second matrix 5110b of the previous player. As a result, the marker 5126 of the first meter 5118 may be located two increments closer to the second end 5124 of the first meter 5118 as shown in FIG. 27.

The live asynchronous game play between the current and previous players may continue until the total duration of time associated with the live game play of the current user has elapsed or expired. In the matrixes 5110a, 5110b, the current player and/or the previous player, respectively, may (a) form and clear one or more complete lines 5012, (b) receive one or more garbage lines 5072, and/or (c) remove one or more garbage lines 5072. As a result, the complete line clears achieved 5062 may increase and the marker 5126 of the first meter 5118 may move one or more increments towards or away from the first end 5122 and/or the second end 5124. A third game-ending condition may occur if the marker 5126 of the first meter reaches the first end 5122 or the second end 5124 of the first meter 5118 during the live asynchronous game play. After the third game-ending condition may occur, a point may be added to the one or more meters displayed by the video game system to indicate that the third game-ending condition may have occurred. Subsequently, the one or more garbage lines 5072 may be removed from the matrix 5010 by the video game system, and the live game play between the current player and the recorded game play of the previous player may continue.

At the expiration of the total duration of time, the live asynchronous game play between the current and previous players is terminated. The video game system may analyze the results of the live game play by the current player and the previous player. The video game system may compare the cleared lines achieved 5062 for the current and previous players. Further, the video game system may analyze a final location of the marker 5126 with respect to the first end 5122 and the second end 5124 of the first meter.

The video game system may determine a winner of the live asynchronous game play based on the comparison of the cleared lines achieved 5062 for the current and previous players. Alternatively, the video game system may determine the winner based on the final location of the marker 5126 of the first meter 5118. After the winner is determined, the video game system may display one or more indicators associated with the results of the live asynchronous game play within the matrixes 5110a, 5110b and/or on the digital display 5060 as shown in FIG. 28.

Figure 28:
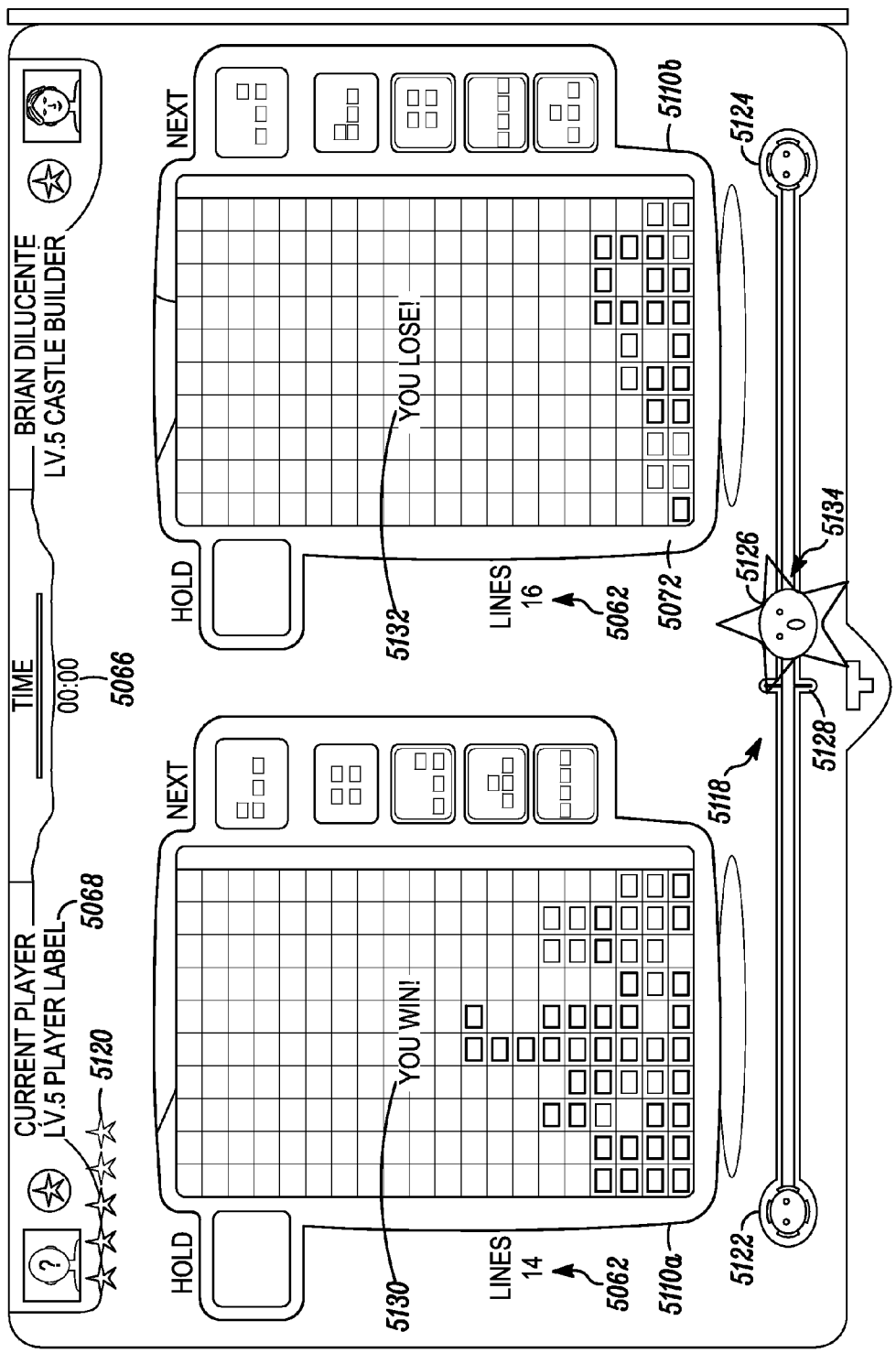
FIG. 28 depicts a video game system having a digital display in an embodiment of the present invention.

For example, the current player may have cleared fourteen (14) complete lines 5012 without any garbage lines 5072 present within the first matrix 5110a and the previous player may have cleared sixteen (16) complete lines 5012 with one (1) garbage line 5072 present in the second matrix 5110b as shown in FIG. 28. However, the marker 5126 of the first meter 5118 is located at a final position that is closer to the second end 5124. The video game system may determine that the current player is the winner and the previous player is the loser based on the final position of the marker 5126 of the first meter 5118. Moreover, the video game system may display a winner indicator 5130 (which may display "YOU WIN!") in the first matrix 5110a, display a loser indicator 5132 (which may display "YOU LOSE!") in the second matrix and/or display a highlighter 5134 around the marker 5126 to indicate that the marker 5126 may be a key factor in the determination of the winner and loser.

Alternatively, the video game system may determine the previous player as the winner based on the number of complete line clears achieved 5062 and not based on the final position of the marker 5126 of the first meter 5118. As a result, the highlighter 5134 may be located around the sixteen (16) complete line clears achieved 5062 to indicate that the number of complete lines 5012 cleared may be the factor in the determination of the winner.

The second meter 5120 may be displayable on a digital display 5060 of the video game system. The second meter 5120 may be an incremental meter having a maximum number of increments. The maximum number of increments for the second meter may be, for example, three (3), five (5) or any number greater than five (5). The present invention should not be deemed as limited to specific embodiment for the number of increments for the second meter 5120.

At the beginning of the live asynchronous game play by the current player, the second meter 5120 may be empty or may not have any of the increments filled. One increment of the second meter 5120 may be added or filled when the current player is the winner of a live asynchronous game play against a recorded game of a previous player. Additionally, one (1) increment of the second meter 5120 may be added or filled when a previous player of a recorded game commits a first game-ending condition, a second game-ending condition or a third game-ending condition (hereinafter "first, second or third game-ending condition"). The skill level of the current player may increase one (1) skill level to an increased skill level after all the increments of the second meter 5120 may be filled. Moreover, the live asynchronous game play by the current player may subsequently continue at the increased skill level.

For example, the second meter 5120 may have five increments as shown in FIGS. 26-28 and four of the five increments may be filled. The current skill level of the current player may be, for example, skill level 5 and the skill level of the recorded games of the previous players may be skill level 5. The current player may win another live asynchronous game play against a recorded game of a previous player and the second meter 5120 may be completely filled. As a result, the skill level of the current player may be increased from skill level 5 to skill level 6 and the live asynchronous game play by the current player may subsequently continue at skill level 6. Accordingly, the live asynchronous game play by the current player may be conducted against one or more recorded games of one or more previous players at skill level 6.

On the other hand, one (1) increment of the second meter 5120 may be removed or emptied when the current player may lose a live asynchronous game play against a previous player or may commit a first, second or third game-ending condition during the live asynchronous game play with the previous player. If the second meter 5120 is empty and the current player a loses a live asynchronous game play against a previous player or commits a first, second or third game-ending condition, the skill level of the current player may decrease one or more skill levels to a decreased skill level. The live asynchronous game play of the current player may subsequently continue at the decreased skill level.

For example, the current skill level of the current player may be skill level 5 and the second meter 5120 may be completely empty. The current player may lose a live asynchronous game play against a recorded game of a previous player at skill level 5. As a result, the skill level of the current player may be reduced to skill level 4 and the live asynchronous game play by the current player may subsequently continue against recorded games of previous players at skill level 4. The current player may subsequently fill the second meter 5120 and increase from skill level 4 to skill level 5 whereby live asynchronous game play by the current player may subsequently continue against recorded games of previous players at skill level 5.

The methods and systems described herein may be deployed in part or in whole through one or more computing devices such as a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a computing device such as a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a computing device such as a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computing devices may include one or more cellular phones, and the methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The computing devices may include mobile devices, and the methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies, Flash, Java, Ruby on Rails, or any other programming language known to the art) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product embodied in a non-transitory computer readable medium that, when executing on one or more computing devices, performs the steps of:
   a. receiving a request for game play;
   b. in response to the request, causing prior game play data to be retrieved from being previously stored on the one or more computing devices in response to prior game play of another user; and
   c. in further response to the request, providing an asynchronous game play environment that presents a simulated version of the prior game play by the another user as a game, wherein an active participant, who made the request, is able to play the game against and interact with, at least more than once during an active period of the game play in the environment, an apparently live participant that is representative of said another user playing said game, said simulated version of the game (i)

adapted to be based upon replay of the prior game play data in certain situations, and (ii) adjusted to be different from said replay in other situations so as to effectuate an impression by the active participant that the apparently live participant is reacting synchronously thereto.

2. The computer program product of claim 1, wherein the simulated version is adjusted based upon data collected and used to determine how the game play by the apparently live participant should affect the game so as to effectuate said impression.

3. The computer program product of claim 2, wherein the data collected is used to enable the replay, when desynchronized, to be recovered and resumed.

4. The computer program product of claim 2, wherein the data, when collected from multiple apparently live participants, is averaged to enable the replay, when desynchronized, to be recovered and resumed.

5. The computer program product of claim 1, wherein the asynchronous game play environment is provided over a mobile computing platform.

6. The computer program product of claim 1, wherein the request is received from a mobile communications device.

7. A computer-implemented method having executable instructions operable on a processor, said method comprising:
   a. providing an asynchronous game play environment wherein an active participant is enabled to play a simulated version of a pre-recorded game by an additional player, the simulated version being different from replay of the pre-recorded game which includes outcomes previously recorded;
   b. desynchronizing said replay so as to effectuate change to said outcomes and to affect live game play with the active participant; and
   c. causing the change to enable the replay to react to the live game play by the active participant such that the active participant is able to play against and interact with the additional player and to perceive the additional player as an apparently live participant being different from playback of the pre-recorded game during the simulated version.

8. The computer-implemented method of claim 7, further comprising, enabling communication with a social network user interface for facilitating interaction amongst the active participant and the additional player as a friend, the social network user interface including a friends tracking component.

9. The computer-implemented method of claim 8, further comprising enabling the active participant to select the additional player as the friend based on the friends tracking component.

10. The computer-implemented method of claim 8, further comprising retrieving game performance information stored previously for the pre-recorded game.

11. The computer-implemented method of claim 10, further comprising presenting the friend as a virtual player represented as the apparently live participant in the simulated version so that the active participant perceives the live game play to be with the friend based on the game performance information.

12. The method of claim 7, wherein the asynchronous game play environment is provided over a mobile computing platform.

13. The method of claim 7, wherein a request for the live game play is received from a mobile communications device.

14. A computer-implemented method for providing an asynchronous game play environment, the method having executable instructions operable on a processor and comprising:
   a. enabling an active participant, who made a request for game play with a desired opponent, to play against an apparently live participant which is a simulation of the desired opponent; and,
   b. facilitating interaction between the active participant and the apparently live participant through a combination of replay of prior game play data associated with the desired opponent, and said replay being adapted with changed outcomes so that the replay appears to react to the game play by the active participant,
wherein the simulation is adjusted to be different from said replay by desynchronizing the replay so as to affect the game play.

15. The method of claim 14, wherein the asynchronous game play environment is provided over a mobile computing platform.

16. The method of claim 14, wherein the request is received from a mobile communications device.

17. The method of claim 14, wherein said replay is adapted with changed outcomes by slowing down to temporarily stopping said replay.

18. The method of claim 14, wherein the asynchronous game play environment is provided through a social networking interface.

19. The method of claim 14, wherein the active player is matched to the desired opponent through a matching engine and a friend's list.

* * * * *

UNITED STATES PATENT AND TRADEMARK OFFICE
CERTIFICATE OF CORRECTION

| | | |
|---|---|---|
| PATENT NO. | : 8,696,469 B2 | Page 1 of 1 |
| APPLICATION NO. | : 13/744444 | |
| DATED | : April 15, 2014 | |
| INVENTOR(S) | : Eui-Joon Youm et al. | |

It is certified that error appears in the above-identified patent and that said Letters Patent is hereby corrected as shown below:

In the Specification

At column 1, line 7, please delete the term "pending".

At column 1, line 8, after "2009,", please insert the phrase, --now U.S. Patent No. 8,357,045 issued on January 22, 2013,--.

At column 32, line 45, please replace "port" with --part--.

In the Claims

At column 46, line 67, after the terms, "playing said game," add the term --wherein--. Also, replace the terms "of the game" with --is--.

At column 47, line 3, after the terms, "other situations", insert the phrase, --by desynchronizing the replay so as to affect the game play and--.

Signed and Sealed this
Twenty-second Day of July, 2014

Michelle K. Lee
*Deputy Director of the United States Patent and Trademark Office*